United States Patent
Motoki

(10) Patent No.: US 9,363,437 B2
(45) Date of Patent: Jun. 7, 2016

(54) IMAGE SENSING APPARATUS AND METHOD OF CONTROLLING OPERATION OF SAME TO REDUCE IMAGE DISTORTION

(71) Applicant: FUJIFILM Corporation, Tokyo (JP)

(72) Inventor: Yoshiaki Motoki, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/541,211

(22) Filed: Nov. 14, 2014

(65) Prior Publication Data
US 2015/0070519 A1 Mar. 12, 2015

Related U.S. Application Data

(63) Continuation of application No. PCT/JP2013/064346, filed on May 23, 2013.

(30) Foreign Application Priority Data

Jun. 22, 2012 (JP) .................................. 2012-140513

(51) Int. Cl.
H04N 5/357 (2011.01)
H04N 5/232 (2006.01)
(Continued)

(52) U.S. Cl.
CPC .......... *H04N 5/23267* (2013.01); *G02B 27/646* (2013.01); *G03B 5/00* (2013.01); *H04N 5/2328* (2013.01); *H04N 5/357* (2013.01); *G03B 2205/0038* (2013.01); *G03B 2217/005* (2013.01)

(58) Field of Classification Search
CPC . H04N 5/23267; H04N 5/357; H04N 5/2328; G02B 27/646; G03B 5/00; G03B 2217/005; G03B 2205/0038
USPC ............... 348/208.99, 208.4, 208.7, 208.14
See application file for complete search history.

(56) References Cited

U.S. PATENT DOCUMENTS 7,978,254 B2 * 7/2011 Katsumata ......... H04N 5/23212
348/169
2006/0017813 A1 1/2006 Okubo et al.
(Continued)

FOREIGN PATENT DOCUMENTS

JP 2005-269130 * 9/2005 ............. H04N 5/243
JP 2005-269130 A 9/2005
(Continued)

OTHER PUBLICATIONS

International Search Report, issued in PCT/JP2013/064346, dated Jul. 9, 2013.
(Continued)

*Primary Examiner* — Nhan T Tran
*Assistant Examiner* — Chan Nguyen
(74) *Attorney, Agent, or Firm* — Birch, Stewart, Kolasch & Birch, LLP

(57) ABSTRACT

Image stabilization, which shifts the center of an image sensing device radially away from the optical axis of an imaging lens is performed multiple times in one frame. A path in a case where the movement of the center of the image sensing device at this time is viewed from the front is generated. A turning point, at which there has been a change in direction from the positive direction to the negative direction or vice versa along the vertical or horizontal direction, is detected in the path generated. The positional relationship between the position of the center of the shifted image sensing device and the optical axis of the imaging lens is determined from the turning point detected. Optical distortion of the image of the subject is corrected by utilizing this positional relationship.

8 Claims, 21 Drawing Sheets

(51) Int. Cl.
  *G03B 5/00* (2006.01)
  *G02B 27/64* (2006.01)

(56) References Cited

U.S. PATENT DOCUMENTS

| | | | |
|---|---|---|---|
| 2008/0151065 A1* | 6/2008 | Okumura | H04N 5/2253 348/208.4 |
| 2008/0180536 A1* | 7/2008 | Nakahara | H04N 5/232 348/208.99 |
| 2009/0015694 A1 | 1/2009 | Saito | |
| 2015/0195456 A1* | 7/2015 | Koskinen | G02B 27/648 348/208.5 |

FOREIGN PATENT DOCUMENTS

| | | |
|---|---|---|
| JP | 2006-33759 A | 2/2006 |
| JP | 2006-129175 A | 5/2006 |
| JP | 2007-233166 A | 9/2007 |
| JP | 2009-17419 A | 1/2009 |

OTHER PUBLICATIONS

Written Opinion of the International Searching Authority, issued in PCT/JP2013/064346, dated Jul. 9, 2013.

* cited by examiner

Fig. 7

| NUMBER OF IMAGE STABILIZATIONS | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| VERTICAL DIRECTION | + | + | + | − | − | − | − | − | − | − | + | + | + | + |
| HORIZONTAL DIRECTION | − | − | − | + | + | + | + | + | + | + | + | + | + | + |
| DISTANCE/POSITION | | | α (P3,Y3) | | | | | | | β (P10,Y10) | | | | γ (P14,Y14) |
| NUMBER OF TIMES RECORDED | | | | | | | | | | | | | | |

IMAGE SENSING APPARATUS AND METHOD OF CONTROLLING OPERATION OF SAME TO REDUCE IMAGE DISTORTION

CROSS-REFERENCE TO RELATES APPLICATIONS

This application is a Continuation of PCT International Application No. PCT JP2013/064346 filed on May 23, 2013, which claims priority under 35 U.S.C. §119(a) to Japanese Patent Application No. 2012-140513 filed Jun. 22, 2012. Each of the above application(s) is hereby expressly incorporated by reference, in its entirety, into the present application.

BACKGROUND OF THE INVENTION

1. Field of the Invention

This invention relates to an image sensing apparatus and to a method of controlling the operation of this apparatus.

2. Description of the Related Art

There are instances where a camera is equipped with an image stabilization function in order to reduce blurring of images due to camera shake.

The description set forth in Patent Document 1 deals with the prevention of stretching that occurs at the periphery of a captured image, owing to optical aberration of the lens, when optical image stabilization is carried out. When camera shake is sensed by a gyro sensor, an offset correction quantity is calculated by a correction calculation circuit and a shake correction is applied optically based upon the calculated offset correction quantity, a reference position is moved within the shooting zone based upon correction vector data indicative of correction direction and correction quantity, and a per-pixel distortion correction is performed on the basis of the moved reference position.

Further, the description set forth in Patent Document 2 deals with accurate restoration of an image by eliminating effects of image distortion in an imaging lens system. Image deterioration information from the optical system is stored in memory, camera shake at shooting time is detected and a time-series camera-shake detection signal is stored in memory, the image data is corrected based upon the optical-system image restoration information and, by using the image data that has been corrected by the image deterioration information, the deterioration of the image data due to camera shake is restored based upon the camera-shake detection signal, whereby restoration of the image, from which the effects of optical-system image deformation have been eliminated, is carried out. The system described in Patent Document 2 provides a circuit for calculating an image restoration function in order to restore image deterioration due to camera shake. The image restoration function is output upon predicting, from the output of a fundamental path calculation circuit, how the original image will change.

Further, the object of Patent Document 3 is to provide a camera, which is equipped with a blur correction function, in which a blur correction can be carried out so as to render inconspicuous a difference in amount of image offset, between screen center position and periphery position during exposure, owing to factors such as the size of the angle of view of the shooting lens. This system finds a correction limit value Δh, which is for when a blur correction is performed in the camera body, in the flash ROM of a lens unit, and limits the amount of shift of an image sensing device at the time of the blur correction. In other words, this system, rather than performing a distortion correction, detects and avoids areas of great distortion.

Patent Document 1: Japanese Patent Application Laid-Open No. 2006-129175

Patent Document 2: Japanese Patent Application Laid-Open No. 2006-33759

Patent Document 3: Japanese Patent Application Laid-Open No. 2007-233166

When image stabilization is carried out, optical distortion and shading and the like can differ frame by frame owing to such factors as direction of camera shake and amount of camera shake, and there are instances were a moving image develops image distortion. In Patent Document 1, however, no consideration is given to image stabilization that strokes in a complex manner within one frame. Further, in Patent Document 2, optical-system image distortion cannot be corrected merely by recording a camera-shake detection signal, and no correction is made for image distortion in an optical system that has been affected by time-series camera shake. Furthermore, in Patent Document 3, a correction based upon camera-shake information frame by frame is not carried out even below the distortion correction limit. Thus, the problems of image distortion and of image distortion in a moving image due to image stabilization cannot be solved by any of Patent Documents 1 to 3.

SUMMARY OF THE INVENTION

An object of the present invention is to reduce image distortion due to image stabilization.

A further object of the present invention is to reduce image distortion in moving images.

A first aspect of the present invention provides an image sensing apparatus having an image sensing device (solid-state electronic image sensing device) for imaging a subject and outputting image data representing the image of the subject, an imaging optical system, which is provided in front of a photoreceptor surface of the image sensing device, for forming the image of the subject on the photoreceptor surface of the image sensing device, and an image stabilization mechanism for correcting relative positions of center of the image sensing device and optical-axis center of the imaging optical system in accordance with camera shake, the image sensing apparatus comprising: a position detection device (position detection means) for detecting, multiple times during period of exposure of the image sensing device, positions to which the center of the image sensing device and the optical-axis center of the imaging optical system have been moved relative to each other by the image stabilization mechanism; an optical-axis position calculation device (optical-axis position calculation means) for calculating, as position of the optical axis, from the positions detected by the position detection device, the position of the optical-axis center of the imaging optical system in the image of the subject imaged by the image sensing device; and a correction device (correction means) for performing at least one correction of an optical distortion correction or shading correction of the image of the subject imaged by the image sensing device, by using the position of the optical-axis center calculated by the optical-axis position calculation device.

The first aspect of the present invention also provides an operation control method suited to the above-described image sensing apparatus. Specifically, the first aspect of the present invention provides a method of controlling an image sensing apparatus having an image sensing device for imaging a subject and outputting image data representing the image of the subject, an imaging optical system, which is provided in front of a photoreceptor surface of the image sensing device, for forming the image of the subject on the photoreceptor surface of the image sensing device, and an image stabilization mechanism for correcting relative positions of center of the image sensing device and optical-axis center of the imaging optical system in accordance with camera shake, the method comprising steps of: a position detection device detecting, multiple times during period of exposure of the image sensing device, positions to which the center of the image sensing device and the optical-axis center of the imaging optical system have been moved relative to each other by the image stabilization mechanism; an optical-axis position calculation device calculating, as position of the optical axis, from the positions detected by the position detection device, the position of the optical-axis center of the imaging optical system in the image of the subject imaged by the image sensing device; and a correction device performing at least one correction of an optical distortion correction or shading correction of the image of the subject imaged by the image sensing device, by using the position of the optical-axis center calculated by the optical-axis position calculation device.

In accordance with the first aspect of the present invention, since the positions to which the center of an image sensing device and the optical-axis center of an imaging optical system have been moved relative to each other by image stabilization are detected multiple times during the period of exposure, the position of the optical-axis center of the imaging optical system in the captured image of the subject can be calculated as the position of the optical axis by using the detected positions. At least one correction of an optical distortion correction or shading correction of the image of the subject can be performed utilizing the calculated position of the optical-axis center. Since the positions to which the center of an image sensing device and the optical-axis center the imaging optical system have been moved relative to each other by image stabilization are detected multiple times during the period of exposure, the position of the optical-axis center of the imaging optical system in the image of the subject can be calculated more accurately and the optical distortion correction or shading correction of the image of the subject can be implemented more accurately. Further, moving-image distortion can be reduced by applying the above-described correction to multiple frames of the image of the subject constituting the moving image.

By way of example, the optical-axis position calculation device calculates the position of the optical axis from a position of maximum offset between the image sensing device and imaging optical system, the position of maximum offset being among the positions detected multiple times by the position detection device.

The apparatus may further comprise a path generation device for generating a path of the positions detected multiple times by the position detection device. In this case, the optical-axis position calculation device would calculate, from the path generated by the path generation device, the position of the optical axis of the imaging optical system in the image of the subject imaged by the image sensing device.

By way of example, the optical-axis position calculation device calculates the position of the optical axis of the imaging optical system in the image of the subject imaged by the image sensing device, this being calculated from a position at which there has been a change in direction in the vertical direction or in the horizontal direction, this position being among positions to which the image sensing device and imaging optical system have been moved relative to each other, these positions being indicated by the path generated by the path generation device.

The optical-axis position calculation device calculates the position of the optical axis of the imaging optical system in the image of the subject imaged by the image sensing device, this being calculated from a position at which there has been a change in direction in the vertical direction or in the horizontal direction in a case where amount of movement is equal to or greater than a threshold value, this position being among positions to which the image sensing device and imaging optical system have been moved relative to each other, these positions being indicated by the path generated by the path generation device.

By way of example, the image sensing device outputs partial image data, which represents a portion of the image of the subject, multiple times during the period of exposure. By way of example, the correction device performs an optical distortion correction or a shading correction of a partial image, which is represented by current partial image data, using positions detected by the position detection device from output of preceding partial image data to output of the current partial image data from the image sensing device.

By way of example, the image sensing device images a subject at a fixed period and outputs image data representing the image of a subject of a moving image, or outputs image data representing the image of a subject of a still image by performing exposure over a given shutter time.

The apparatus may further comprise a zoom lens for changing the size of the image of the subject, which is formed on the photoreceptor surface of the image sensing device, without changing focal length of the imaging optical system. In this case, the correction device would perform an optical distortion correction of the image of the subject imaged by the image sensing device, using a position detected by the position detection device, when the position of the zoom lens is such that amount of optical distortion is equal to or greater than a first threshold value or less than a second threshold value.

A second aspect of the present invention provides an image sensing apparatus having an image sensing device for imaging a subject and outputting image data representing the image of the subject, an imaging optical system, which is provided in front of a photoreceptor surface of the image sensing device, for forming the image of the subject on the photoreceptor surface of the image sensing device, and an image stabilization mechanism for correcting relative positions of center of the image sensing device and optical-axis center of the imaging optical system in accordance with camera shake, the image sensing apparatus comprising: a position detection device (position detection means) for detecting, multiple times during period of exposure of the image sensing device, positions to which the center of the image sensing device and the optical-axis center of the imaging optical system have been moved relative to each other by the image stabilization mechanism, detection including detection of initial position of the center of the image sensing device and of the optical-axis center of the imaging optical system at the beginning of the period of exposure; and a correction device (correction means) for performing at least one correction of an optical distortion correction or shading correction of the image of the subject imaged by the image sensing device, using the initial positions and other positions detected by the position detection device.

The second aspect of the present invention also provides an operation control method suited to the above-described image sensing apparatus. Specifically, the second aspect of the present invention provides a method of controlling an image sensing apparatus having an image sensing device for imaging a subject and outputting image data representing the image of the subject, an imaging optical system, which is provided in front of a photoreceptor surface of the image sensing device, for forming the image of the subject on the photoreceptor surface of the image sensing device, and an image stabilization mechanism for correcting relative positions of center of the image sensing device and optical-axis center of the imaging optical system in accordance with camera shake, the method comprising steps of: a position detection device detecting, multiple times during period of exposure of the image sensing device, positions to which the center of the image sensing device and the optical-axis center of the imaging optical system have been moved relative to each other by the image stabilization mechanism, detection including detection of initial position of the center of the image sensing device and of the optical-axis center of the imaging optical system at the beginning of the period of exposure; and a correction device performing at least one correction of an optical distortion correction or shading correction of the image of the subject imaged by the image sensing device, using the initial positions and other positions detected by the position detection device.

In accordance with the second aspect of the present invention, the positions to which the center of an image sensing device and the optical-axis center of an imaging optical system have been moved relative to each other by image stabilization are detected multiple times during the period of exposure, this detection including detection of initial position of the center of the image sensing device and of the optical-axis center of the imaging optical system at the beginning of the period of exposure. Therefore, at least one correction of an optical distortion correction or shading correction of the image of the subject can be performed comparatively accurately by utilizing the detected initial positions and other positions. Further, moving-image distortion can be reduced by applying the above-described correction to multiple frames of the image of the subject constituting the moving image.

A third aspect of the present invention provides an image sensing apparatus having an image sensing device for imaging a subject and outputting image data representing the image of the subject, an imaging optical system, which is provided in front of a photoreceptor surface of the image sensing device, for forming the image of the subject on the photoreceptor surface of the image sensing device, and an image stabilization mechanism for correcting relative positions of center of the image sensing device and optical-axis center of the imaging optical system in accordance with camera shake, the image sensing apparatus comprising: a position detection device (position detection means) for detecting, multiple times during period of exposure of the image sensing device, positions to which the center of the image sensing device and the optical-axis center of the imaging optical system have been moved relative to each other by the image stabilization mechanism; a path generation device (path detection means) for generating a path of the positions detected multiple times by the position detection device; and a correction device (correction means) for performing at least one correction of an optical distortion correction or shading correction using a position at which a change in direction has occurred after the number of times the image sensing device and the imaging optical system have been moved relative to each other has exceeded a predetermined number of times without there being a change in direction in the vertical direction or in the horizontal direction on the path generated by said path generation device.

The third aspect of the present invention also provides an operation control method suited to the above-described image sensing apparatus. Specifically, the third aspect of the present invention provides a method of controlling an image sensing apparatus having an image sensing device for imaging a subject and outputting image data representing the image of the subject, an imaging optical system, which is provided in front of a photoreceptor surface of the image sensing device, for forming the image of the subject on the photoreceptor surface of the image sensing device, and an image stabilization mechanism for correcting relative positions of center of the image sensing device and optical-axis center of the imaging optical system in accordance with camera shake, the method comprising steps of: a position detection device detecting, multiple times during period of exposure of the image sensing device, positions to which the center of the image sensing device and the optical-axis center of the imaging optical system have been moved relative to each other by the image stabilization mechanism; a path generation device generating a path of the positions detected multiple times by the position detection device; and a correction device performing at least one correction of an optical distortion correction or shading correction using a position at which a change in direction has occurred after the number of times the image sensing device and the imaging optical system have been moved relative to each other has exceeded a predetermined number of times without there being a change in direction in the vertical direction or in the horizontal direction on the path generated by the path generation device.

In accordance with the third aspect of the present invention, the positions to which the center of an image sensing device and the optical-axis center of an imaging optical system have been moved relative to each other by image stabilization are detected multiple times during the period of exposure, and a path of these positions is generated. At least one correction of an optical distortion correction or shading correction of the image of the subject is performed using a position at which a change in direction has occurred after the number of times the image sensing device and the imaging optical system have been moved relative to each other has exceeded a predetermined number of times without there being a change in direction in the vertical direction or in the horizontal direction on the generated path. In a case where a change in direction takes place after the predetermined number of times is exceeded, as mentioned above, often the position at which the change in direction has taken place is considerably offset from the initial position. Since the optical distortion correction or shading correction of the image of the subject is performed using such a position, the correction can be carried out comparatively accurately. Further, moving-image distortion can be reduced by applying the above-described correction to multiple frames of the image of the subject constituting the moving image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a table illustrating directions in which the image sensing device has been shifted by image stabilization;

DESCRIPTION OF THE PREFERRED EMBODIMENTS

Figure 1:
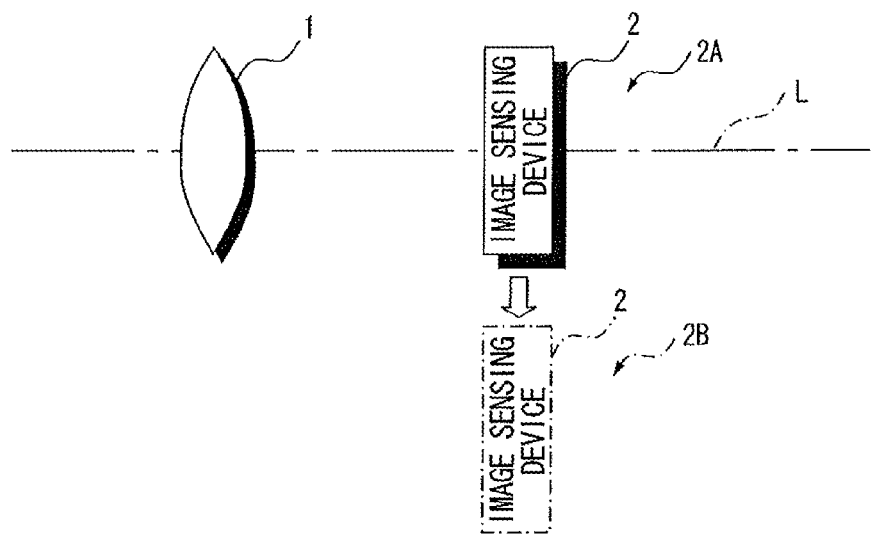
FIG. 1 illustrates the relationship between an imaging lens and an image sensing device.
Figure 2:
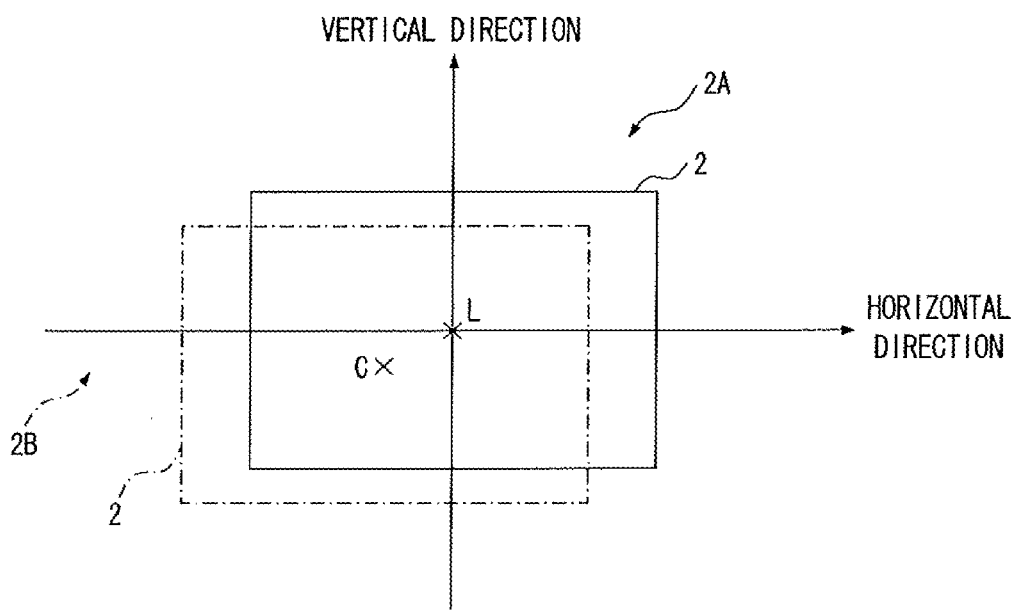
FIG. 2 illustrates the manner in which the image sensing device is shifted by image stabilization.

FIG. 1, which illustrates a preferred embodiment of the present invention, is a side view showing the positional relationship between an imaging lens 1 and an image sensing device 2 of an image sensing apparatus. FIG. 2 is a front view illustrating positional relationship before and after shifting of the image sensing device 2.

With reference to FIG. 1, the imaging lens 1, which forms the image of a subject on the photoreceptor surface of the image sensing device 2, has been placed in front (left side in FIG. 1) of the photoreceptor surface of image sensing device 2. The image sensing device 2 is capable of being shifted in the vertical direction (up and down in FIGS. 1 and 2) and in the horizontal direction (left and right in FIG. 2). If the image sensing apparatus has sustained shaking, image stabilization is carried out by shifting the image sensing device 2 in the vertical and horizontal directions (or in the vertical direction or horizontal direction).

In the initial state, the imaging lens 1 has an optical axis L positioned so as to pass through the center of the image sensing device 2 as indicated at 2A in FIGS. 1 and 2. If camera shake is detected, the image sensing device 2, which was at the position indicated by 2A, is shifted to, say, a position indicated by 2B, so as to correct for camera shake in accordance with the direction and amount of camera shake. As illustrated in FIG. 2, in a case where the image sensing device 2 was at the position indicated by 2A, the optical axis L will pass through the center of the image sensing device 2, but if the image sensing device 2 is shifted to the position indicated at 2B, then the optical axis L will no longer pass through the center C of the image sensing device 2.

Figure 3:
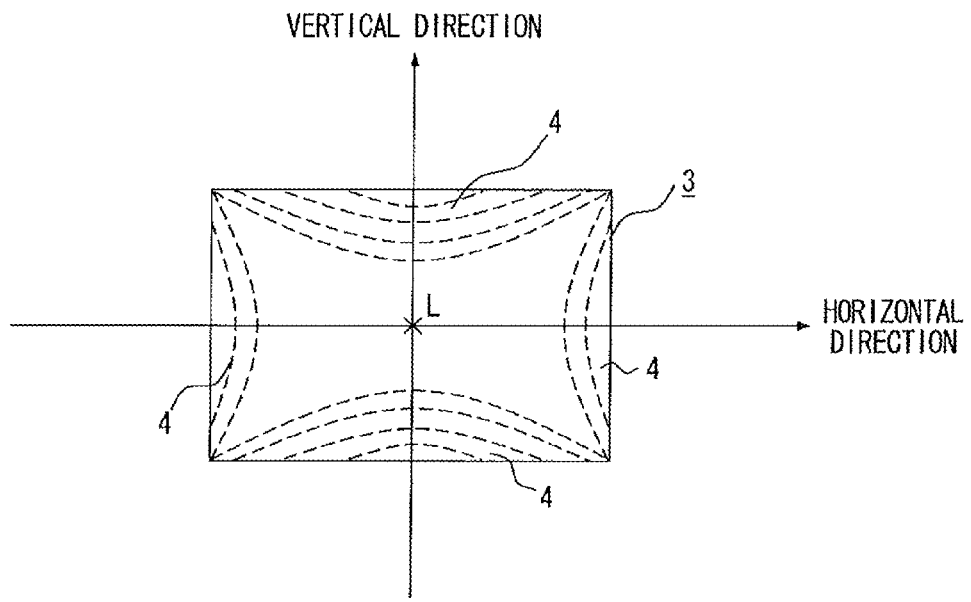
FIGS. 3 and 4 illustrate the manner in which optical distortion is produced in the image of an imaged subject.

FIG. 3 is an example of a subject image 3 obtained in a case where the image sensing device 2 is present at the position 2A as shown in FIGS. 1 and 2.

The subject image formed by the imaging lens 1 develops distorted portions 4 due to distortion of the imaging lens 1. Since the subject image 3 is one obtained from the image sensing device 2 in the case of such a positional relationship between the imaging lens 1 and the image sensing device 2 that the optical axis L passes through the center of the image sensing device 2, the degree of distortion increases with distance, along the radial direction, from the center of the subject image 3.

Figure 4:
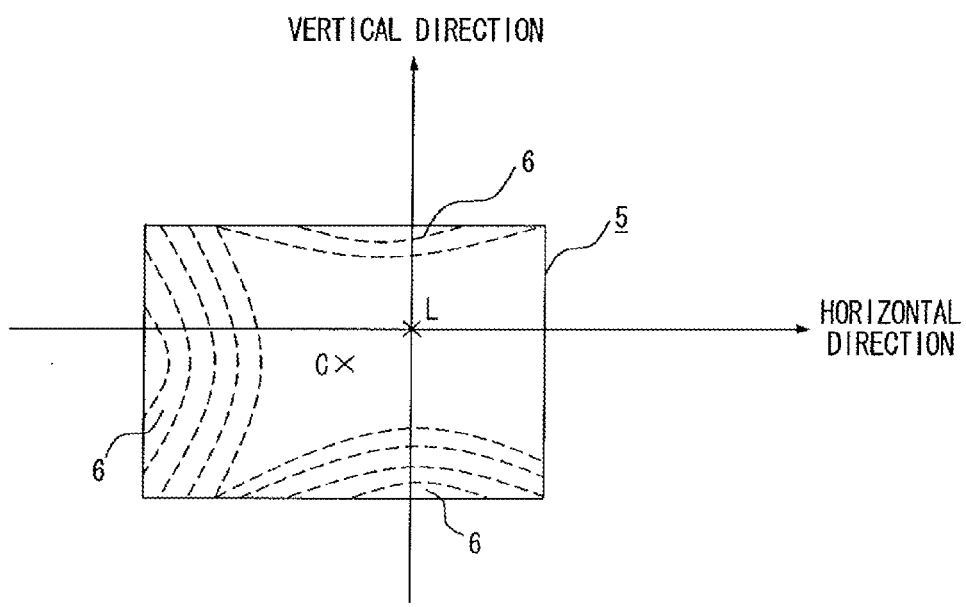

FIG. 4 is an example of a subject image 5 obtained in a case where the image sensing device 2 is present at the position 28 as shown in FIGS. 1 and 2.

By shifting the image sensing device 2, the subject image 5 is one obtained from the image sensing device 2 in the case of such a positional relationship between the imaging lens 1 and the image sensing device 2 that the optical axis L does not through the center C of the image sensing device 2. Distorted portions 6 in the subject image 5 do not undergo an increase in degree of distortion with distance, along the radial direction, from the center C of the subject image 5, but rather experience an increase in degree of distortion with distance, along the radial direction, from the optical axis L.

If we assume that the subject image 3 shown in FIG. 3 is the first frame of an image and that the subject image 5 shown in FIG. 4 is the second frame of an image, then moving-image distortion, in which the distorted portions change frame by frame, will occur when the images are viewed as a moving image. In this embodiment, moving-image distortion is reduced by correcting for optical distortion.

Figure 5:
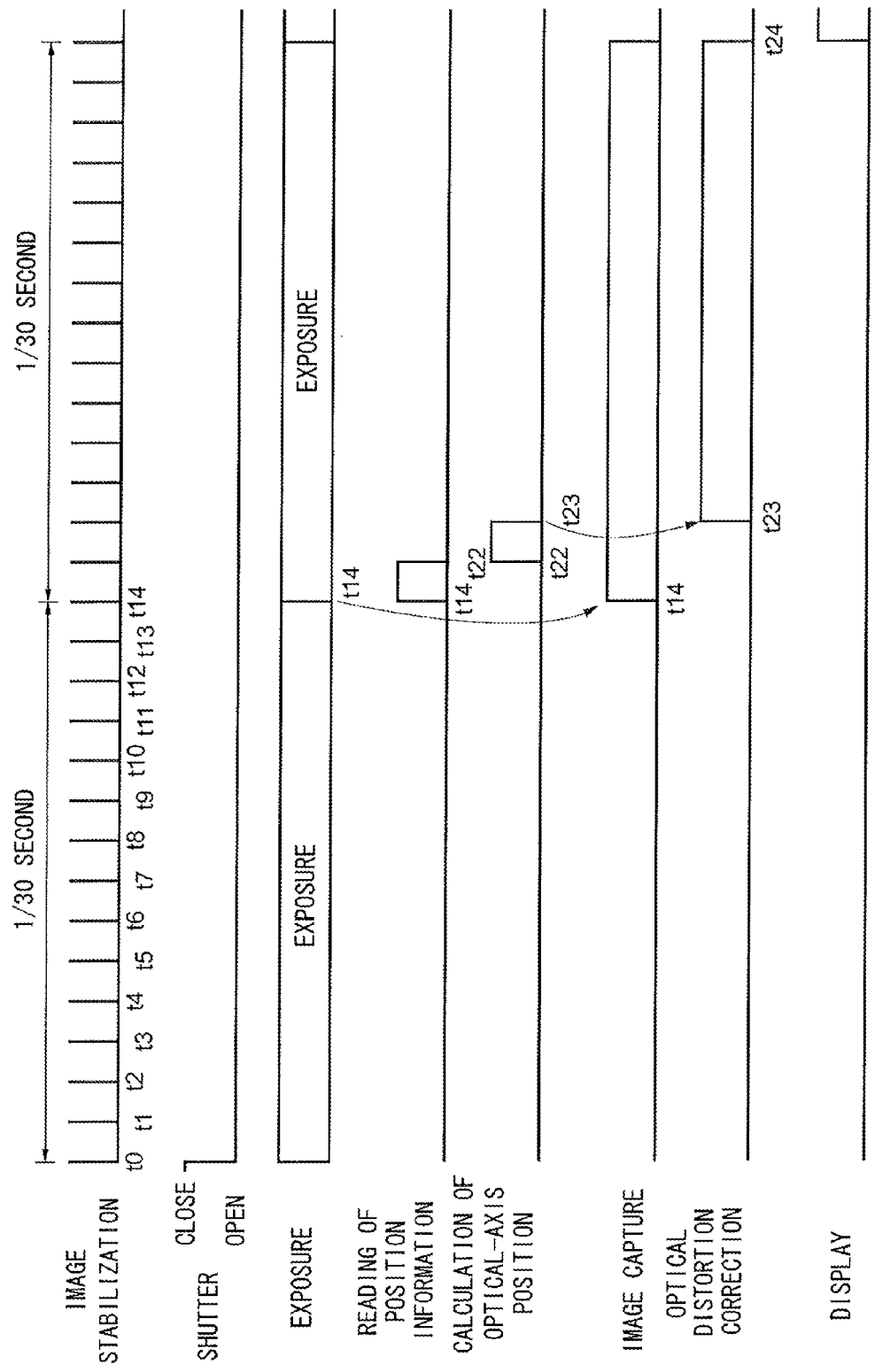
FIG. 5 is a time chart of an image sensing apparatus.

FIG. 5 is a time chart of the image sensing apparatus according to this embodiment.

In this embodiment, camera-shake detection is performed multiple times during a period of exposure over which one frame of an image is obtained, and positions to which the center of the image sensing device 2 and the optical-axis center of the imaging lens 1 have been moved relative to each other by image stabilization, which is carried out based upon such multiple detection of camera shake, are detected.

In FIG. 5, a moving image is captured and the shutter is open. Imaging of a subject is repeated at a period of 1/30 of a second over a period of exposure of 1/30 of a second. Camera-shake detection (image stabilization) is performed 14 times over the period of exposure of 1/30 of a second. It goes without saying that it will suffice if camera-shake detection is performed multiple times over the period of exposure, and it may be arranged so that camera-shake detection is performed less than 14 times or more than 14 times over the period of exposure. In FIG. 5, camera-shake detection is carried out at 14 timings from time t1 to time t14 over the period of exposure of 1/30 of a second extending from time t0 to time t14.

Figure 6:
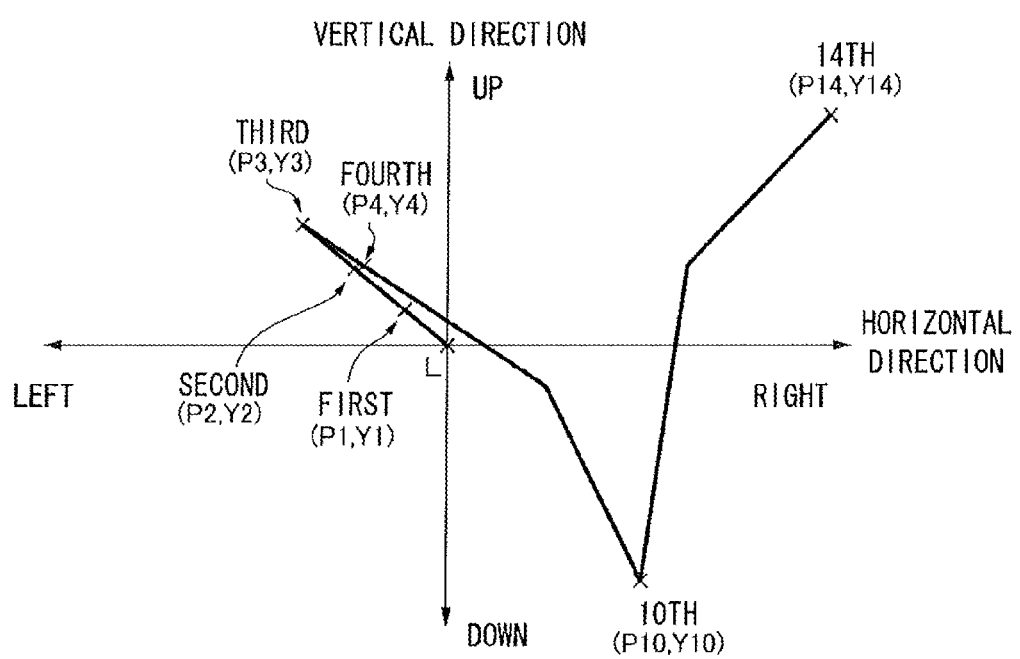
FIG. 6 illustrates a path along which the image sensing device has been shifted by image stabilization.

FIG. 6 illustrates a path of the center of the image sensing device 2, as viewed from the front, when the image sensing device 2 has been shifted by camera-shake detection performed 14 times over the exposure period. The horizontal axis indicates amount of shift in the horizontal direction and the vertical axis the amount of shift in the vertical direction. The origin is the position of the optical axis L and, as mentioned above, coincides with the position of the center of the image sensing device 2 at the initial position thereof. Let the direction of a rightward shift of the image sensing device 2 be the positive direction, let the direction of a leftward shift of the image sensing device 2 be the negative direction, let the direction of an upward shift of the image sensing device 2 be the positive direction, and let the direction of a downward shift of the image sensing device 2 be the negative direction.

FIG. 7 is a table illustrating the path shown in FIG. 6. In a case where the image sensing device 2 has been shifted upward, a "+" symbol, which indicates that the image sensing device 2 has been shifted in the positive vertical direction, is entered in the table in FIG. 7, and in a case where the image sensing device has been shifted downward, a "−" symbol, which indicates that the image sensing device 2 has been shifted in the negative vertical direction, is entered. Further, viewing the image sensing device 2 from the front, in a case where the image sensing device 2 has been shifted rightward, a "f" symbol, which indicates that the image sensing device 2 has been shifted in the positive horizontal direction, is entered, and in a case where the image sensing device 2 has been shifted leftward, a "−" symbol, which indicates that the image sensing device 2 has been shifted in the negative horizontal direction, is entered.

With reference to FIGS. 6 and 7, it is assumed that the image sensing device 2 has been moved in the positive vertical direction and in the negative horizontal direction (to P1,Y1) by the first camera-shake detection. Accordingly, the symbols indicative of these directions are entered in the table of FIG. 7 in a column for the first camera-shake detection. With the position of the image sensing device 2 that prevailed at the immediately preceding camera-shake detection serving as a reference, it is detected whether the image sensing device 2 has been moved in the vertical or horizontal direction by the second camera-shake detection. It is assumed that the image sensing device 2 has been moved further in the vertical direction and further in the horizontal direction (to P2, Y2) by the second camera-shake detection. Accordingly, the symbols indicative of these directions are entered in the table of FIG. 7 in a column for the second camera-shake detection. Thus, when the image sensing device 2 is moved by camera-shake detection, symbols indicating the directions of movement from the position of the image sensing device 2 that prevailed at the time of the preceding camera-shake detection are entered in the table shown in FIG. 7.

It is assumed that the directions of movement of the image sensing device 2 in a fourth camera-shake detection are opposite, along both the vertical and horizontal directions, from the directions of movement of the image sensing device 2 in a third camera-shake detection, which is the preceding camera-shake detection. Accordingly, the "−" symbol indicating the negative vertical direction and the "+" symbol indicating the positive horizontal direction are entered in a column for the fourth camera-shake detection. It is assumed that, during the period of time from the fifth to the tenth camera-shake detection, the directions of movement of the image sensing device 2 are no different from the directions of movement in the respective preceding camera-shake detections. Accordingly, symbols indicating directions identical with those in the fourth column are entered in the fourth to the tenth columns of the multiple camera-shake detections. It is assumed that, in the $11^{th}$ camera-shake detection, only movement along the vertical direction is the opposite of the direction of movement of the image sensing device 2 in the tenth camera-shake detection, which is the preceding camera-shake detection. Accordingly, the "+" symbols indicating the positive direction in both the vertical and horizontal directions are entered in the $11^{th}$ column of the multiple camera-shake detections. If it is assumed that, during the period of time from the 12th to the 14th camera-shake detection, the directions of movement of the image sensing device 2 are no different from the directions of movement in the respective preceding camera-shake detections, then symbols indicating directions identical with those in the 11th column are entered in the 11th to the 14th columns of the multiple camera-shake detections.

In a case where there is a change in direction from the positive to the negative direction along the vertical direction and a change in direction from the negative to the positive direction along the horizontal direction from the third camera-shake detection to the fourth camera-shake detection, as well as a change in direction in such a manner that there is a change from the negative to the positive direction along the vertical direction from the 10th camera-shake detection to the 11th camera-shake detection, as described above, distances to the origin from the positions (turning points) of the image sensing device 2 at which camera-shake detection was performed immediately prior to camera-shake detection where a change in direction was determined are entered in the table shown in FIG. 7. Further, the distance to the origin from the position of the image sensing device 2 at which the final camera-shake detection was performed also is entered in the table shown in FIG. 7. Further, a recording count, which indicates the numbers of times these distances and positions have been entered, is also entered in the table shown in FIG. 7.

When the position of the image sensing device 2 is moved in accordance with camera-shake detection in the manner described above, the path of the center of the image sensing device 2 takes on the form shown in FIG. 6.

With reference again to FIG. 5, camera-shake detection is performed 14 times in one frame, as mentioned above. When time t14 is reached and one frame of exposure ends, the position information that has been stored in the table in the manner described above is read until time t22. From time t22 to time t23, the optical-axis position in the image of the subject is calculated based upon the read position information (in the above-described case, this will be three items of position information because information has been recorded three times).

Figure 8:
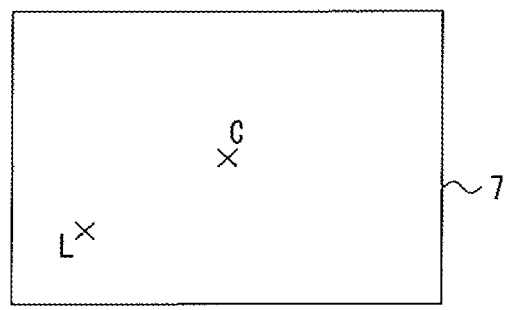
FIG. 8 is an example of the image of a subject.

FIG. 8 illustrates the image of a subject obtained by imaging.

The optical-axis position L in a subject image 7 is ascertained by calculation. Since the subject image 7 has been captured by the image sensing device 2 shifted by image stabilization, optical-axis position L is not necessarily the position of the center C of the subject image.

With reference again to FIG. 5, image data is read from the image sensing device 2 when time t14 arrives. When time t23 arrives, the read image data is subjected to an optical distortion correction using the calculated reference position. When time t24 arrives, the image corrected for optical distortion is displayed.

Figure 9:
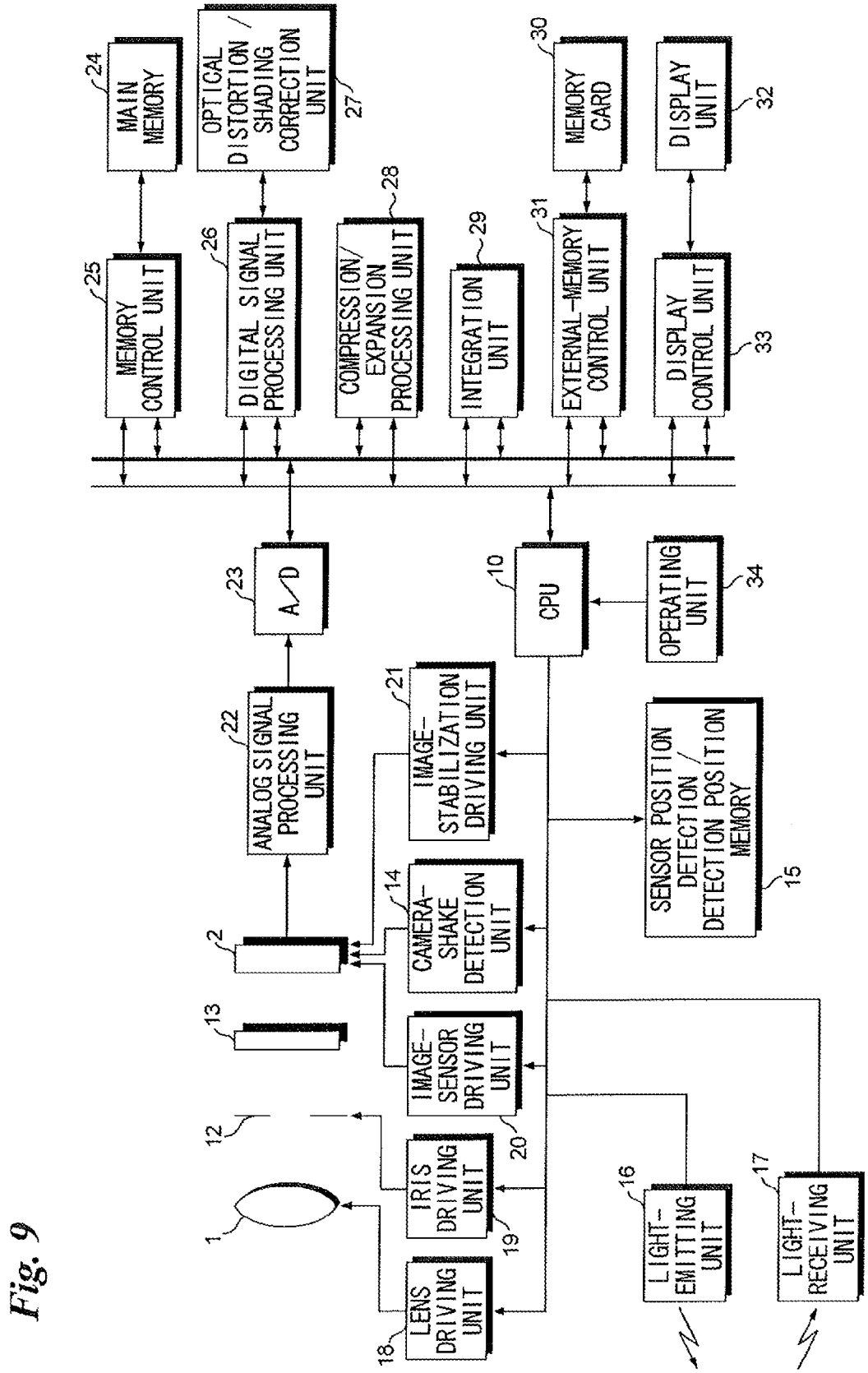
FIG. 9 is a block diagram illustrating the electrical configuration of the image sensing apparatus.

FIG. 9 is a block diagram illustrating the electrical configuration of the image sensing apparatus.

The overall operation of the image sensing apparatus is controlled by a CPU 10.

The image sensing apparatus includes an operating unit 34 having switches, buttons and the like for inputting an imaging command and the like. An operation signal that is output from the operating unit 34 is input to the CPU 10. The image sensing apparatus includes a light-emitting unit 16 for illuminating the subject and a light-receiving unit 17 for receiving light reflected from the subject.

The imaging lens 1 has been positioned in front of the image sensing device 2, as mentioned above. (There is a mechanical shutter in front of the imaging lens 1 but this is not illustrated.) An iris 12 and an optical low-pass filter 13 are disposed between the photoreceptor surface of the image sensing device 2 and the imaging lens 1. The imaging lens 1 is positioned along the direction of the optical axis by a lens driving unit 18, and the amount by which the iris 12 is opened and closed is controlled by an iris driving unit 19. The video signal output, etc., of the image sensing device 2 is controlled by an image-sensor driving unit 20. The image sensing apparatus further includes a camera-shake detection unit 14 for detecting camera shake sustained by the image sensing device 2 and an image-stabilization driving unit 21 for shifting the image sensing device 2. The image sensing apparatus further includes a sensor position detection/detection position memory 15. The position of the image sensing device 2 is detected, in a case where the image sensing device 2 has been shifted by image stabilization in the manner described above, by the sensor position detection/detection position memory 15, and data indicating the detected position is stored in the sensor position detection/detection position memory 15. Thus is generated the path shown in FIG. 6. The table shown in FIG. 7 also is stored in the sensor position detection/detection position memory 15.

The video signal that has been output from the image sensing device is subjected to predetermined analog signal processing such as white balance in an analog signal processing unit 22, which outputs the processed signal. The video signal that is output from the analog signal processing unit 22 is converted to digital image data by an analog/digital conversion circuit 23.

The digital image data is recorded temporarily in a main memory 24 by a memory control unit 25. The digital image data is read out of the main memory 24 and is subjected to predetermined digital signal processing such as a gamma correction in a digital signal processing unit 26. The digital image data is input to an optical distortion/shading correction unit 27, subjected to an optical distortion correction in the manner set forth above, and subjected to a shading correction with the reference position serving as the reference. The image data that has been subjected to correction such as the optical distortion correction is applied to a display unit 32 under the control of a display control unit 33, whereby the image of the subject, which has been subjected to correction such as the optical distortion correction, is displayed on the display screen of the display unit 32.

The digital image data read out of the main memory 24 is input to an integration unit 29 as well. The integration unit 29 integrates the luminance component and adjusts the aperture value of the iris 12 based upon the integrated value obtained.

When a record command is applied from the operating unit 34, the image data that has been corrected for optical distortion and the like as described above is applied to and recorded on a memory card 30 under the control of an external-memory control unit 31.

Figure 10:
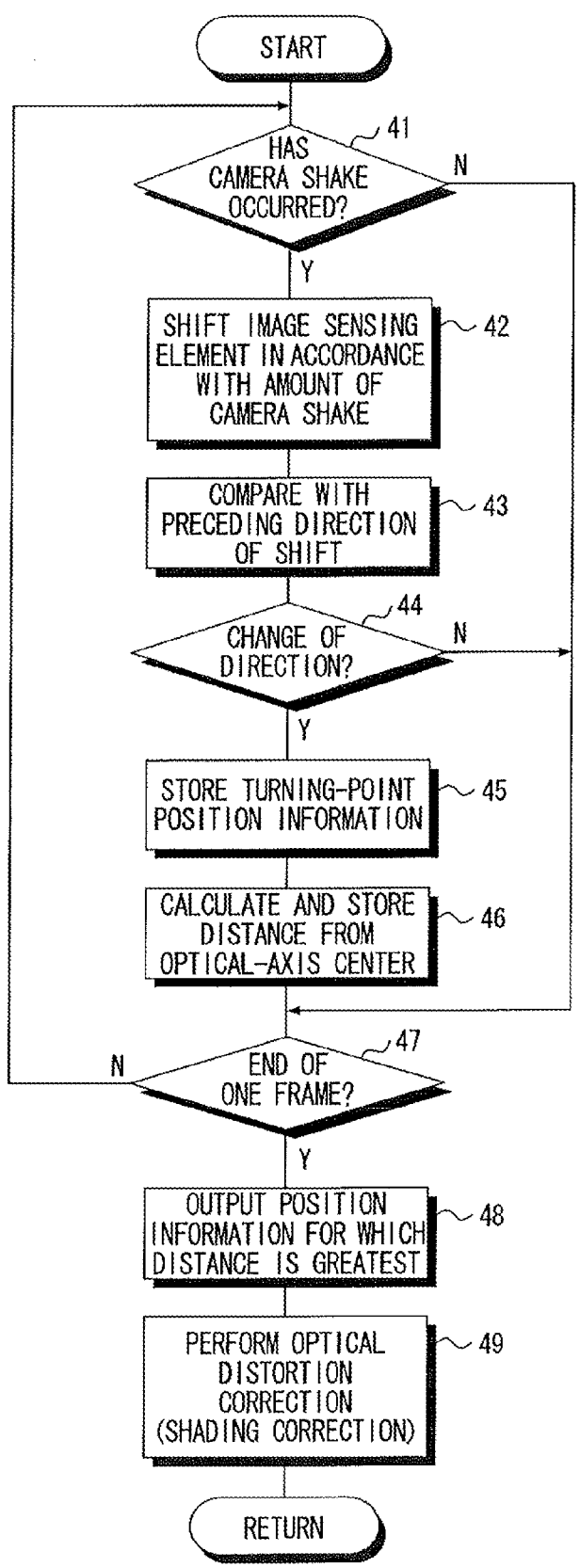
FIGS. 10 to 13 are flowcharts illustrating optical distortion correction processing.

FIG. 10 is a flowchart illustrating optical distortion correction processing executed by the image sensing apparatus.

The timing of camera-shake detection, which is performed multiple times over the period of exposure, is predetermined and camera-shake detection is carried out when such timing arrives, as mentioned above. If camera shake is discriminated by camera-shake detection (step 41), the image sensing device 2 is shifted in such a manner that image stabilization is performed in accordance with the amount of direction of camera shake (step 42). As described above, a comparison is made with the shift direction performed at the time of the preceding camera-shake detection and a determination is made as to whether there has been a change in direction, in at least one of the vertical direction or horizontal direction, such as a change from a shift in the positive direction to a shift in the negative direction or vice versa. If there has been a change in direction ("YES" at step 44), position information as to the turning point where the change in direction occurred is stored in the sensor position detection/detection position memory 15 (step 45), as mentioned above. Further, the distance from the optical-axis center of the imaging lens 1 to the center of the shifted image sensing device 2 is calculated and data representing the calculated distance is also stored in the sensor position detection/detection position memory 15 (step 46). The processing of steps 41 to 46 is repeated (step 47) until one frame ends (step 47).

From among the distances, which have been stored in the sensor position detection/detection position memory 15, from the optical-axis center of the imaging lens 1 to the center of the image sensing device 2, position information, indicating the center of the image sensing device 2, for which the distance is greatest is read from the sensor position detection/detection position memory 15 (step 48). Optical distortion and shading corrections are carried out with the read center-position information serving as the reference position (step 49).

When image stabilization is performed multiple times over the period of exposure, there are cases where the amount of shift of the image sensing device 2 during the course of exposure will be greater than the amount of shift of the image sensing device 2 at the end of exposure. In such case, performing the optical distortion correction based upon the amount of shift of the image sensing device 2 during the course of exposure will allow a more accurate optical distortion to be achieved than performing the optical distortion correction based upon the amount of shift of the image sensing device 2 at the end of exposure. In accordance with this embodiment, highly accurate corrections such as the optical distortion correction can be achieved because the corrections such as the optical distortion correction are performed based upon a position of the image sensing device 2 for which the amount of shift is large.

In the foregoing embodiment, optical distortion is corrected for by using center-position information of the image sensing device 2 for which distance is greatest among the distances, stored in the sensor position detection/detection position memory 15, from the optical-axis center of the imaging lens 1 to the center of the image sensing device 2. However, it may be arranged so that, by using multiple items of center-position information and not merely center-position information of the image sensing device 2 for which the distance is greatest, the average position of optical-axis positions which prevail when the respective multiple items of center-position information are obtained is adopted as the optical-axis position and the optical distortion correction is performed utilizing this optical-axis position.

Figure 11:
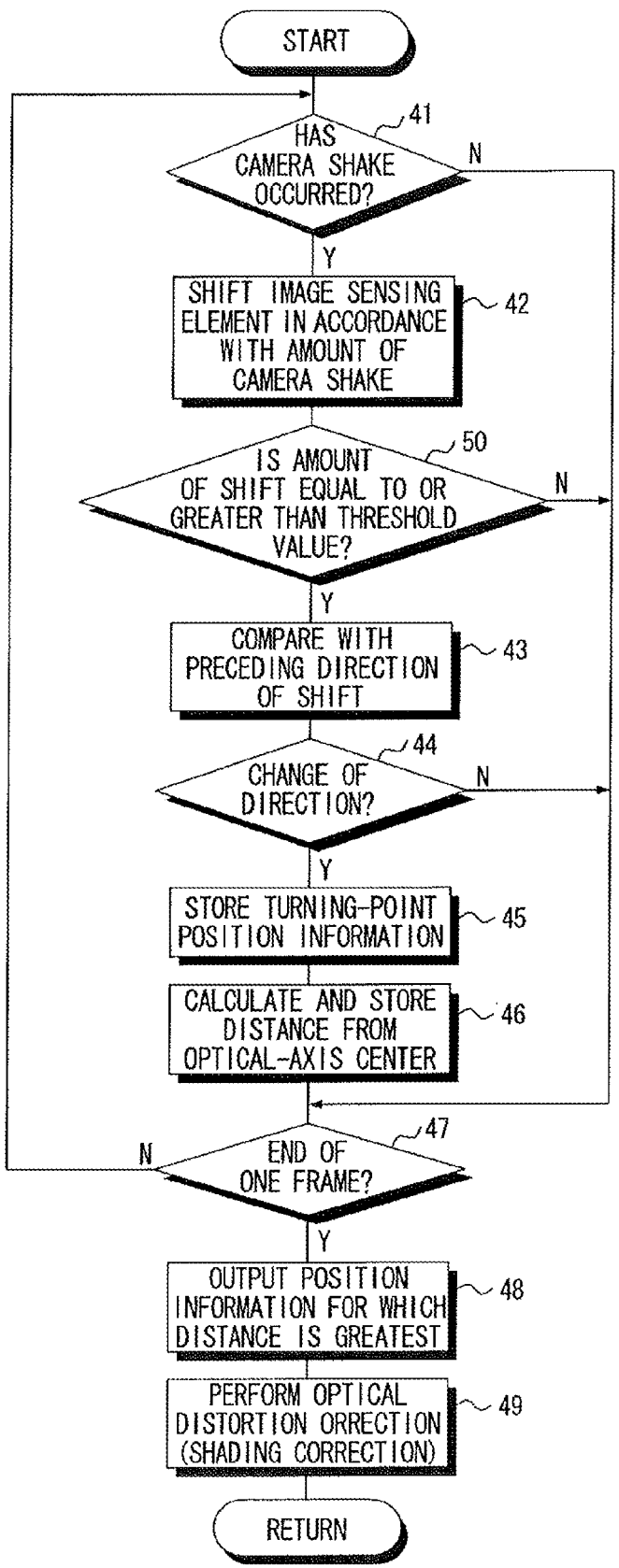

FIG. 11, which illustrates processing according to another embodiment, is a flowchart illustrating optical distortion correction processing executed by the image sensing apparatus. Processing steps in FIG. 11 identical with those shown in FIG. 10 are designated by like step numbers and need not be described again.

According to the processing shown in FIG. 10, when the image sensing device 2 is shifted in accordance with the amount of camera shake, whether a change in direction has occurred is determined by making a comparison with the preceding direction of shift. In the processing shown in FIG. 11, however, when the image sensing device 2 is shifted in accordance with the amount of camera shake, it is determined whether the amount of this shift is equal to or greater than a threshold value (step 50). If the amount of shift is equal to or greater than the threshold value ("YES" at step 50), then whether a change in direction has occurred is determined by making a comparison with the preceding direction of shift (steps 43, 44).

In the case of an amount of shift so small that camera shift is detected erroneously due to noise or the like, no determination is made as to whether a change in direction has occurred or not. This means that storage of position information concerning the image sensing device 2 based upon such erroneous detection is prevented.

Figure 12:
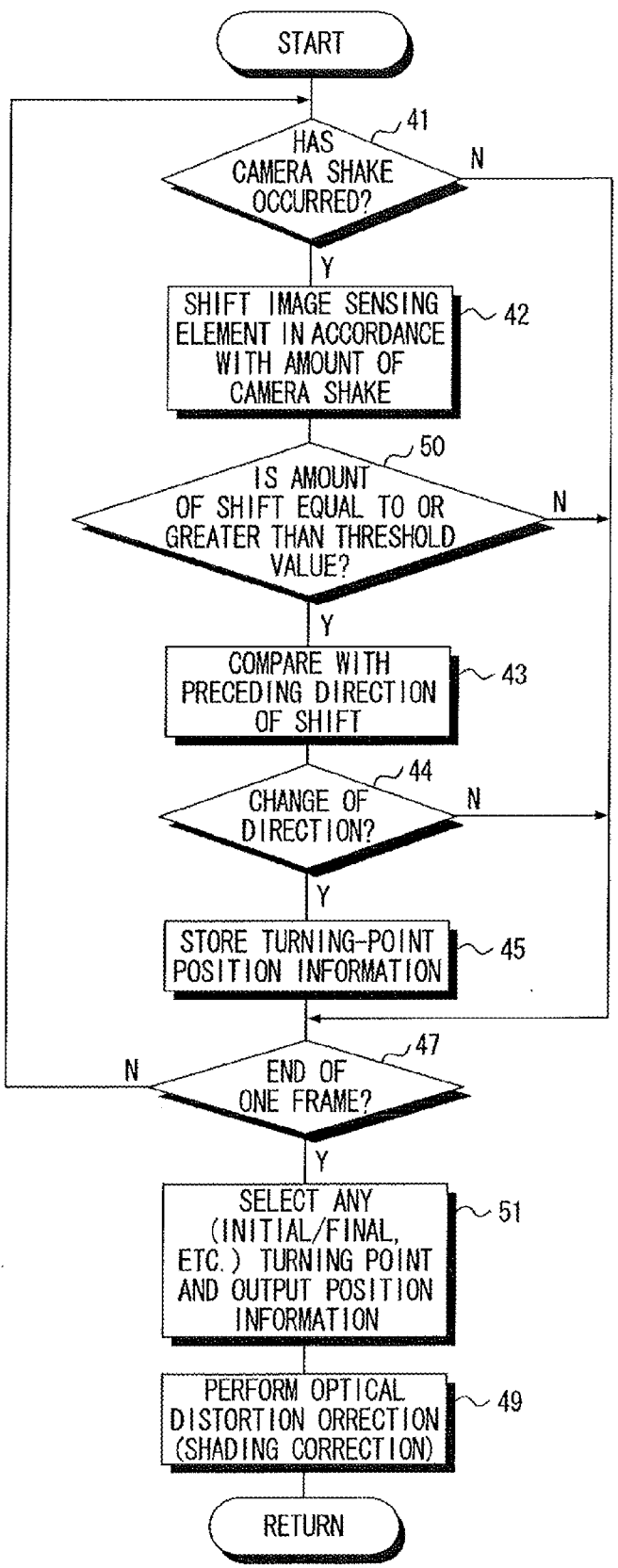

FIG. 12, which illustrates processing according to another embodiment, is a flowchart illustrating optical distortion correction processing executed by the image sensing apparatus. Processing steps in FIG. 12 identical with those shown in FIG. 11 are designated by like step numbers and need not be described again.

In the processing illustrated in FIGS. 10 and 11, distance from the optical-axis center to the center of the image sensing device 2 is calculated based upon position information indicating a turning point (step 46), as described above. In the processing shown in FIG. 12, however, calculation of the distance from the optical-axis center to the center of the image sensing device 2 is eliminated. Instead, any turning point such as an initial or final turning point is selected and the selected turning point is output (step 51). The position of the optical axis is calculated from the selected turning point and a correction such as an optical distortion correction is performed using the position of the optical axis (step 49). Since the distance from the optical-axis center to the center of the image sensing device 2 is not calculated, a correction such as an optical distortion correction is carried out comparatively quickly.

Figure 13:
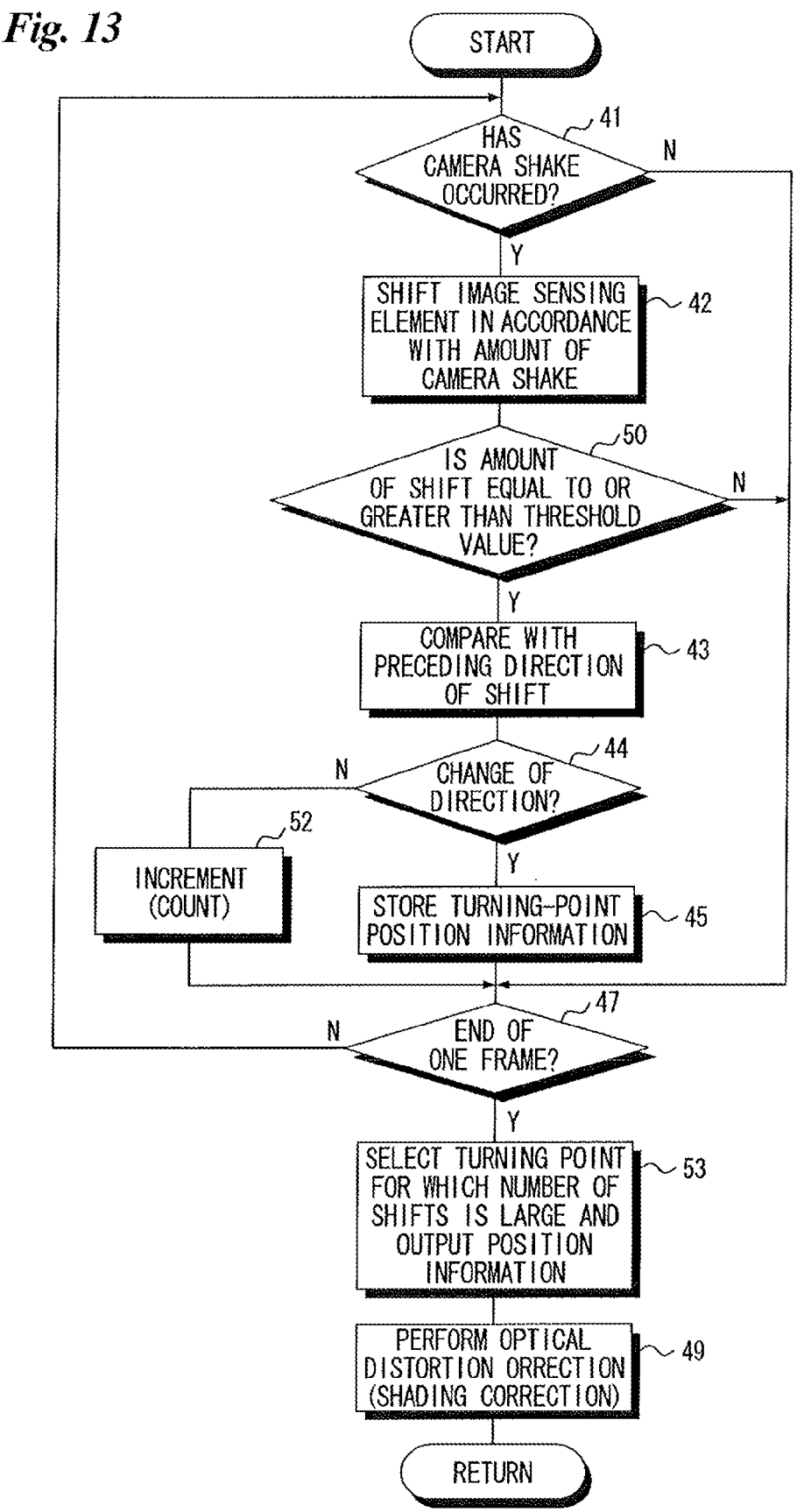

FIG. 13, which illustrates processing according to another embodiment, is a flowchart illustrating optical distortion correction processing executed by the image sensing apparatus. Processing steps in FIG. 13 identical with those shown in FIG. 12 are designated by like step numbers and need not be described again.

In the embodiment shown in FIG. 13, if, in a case where the image sensing device 2 has been shifted, the shift is in the same direction as that of the preceding shift, then the number of times the image sensing device 2 has been shifted successively without a change in direction is counted to obtain the number of times (step 52). Next, with regard to a turning point for which a change in direction has occurred following a large number of shifts from among the number of times the image sensing device 2 has been shifted successively without a change in direction, position information indicative of this turning point is output (step 53). If, in a case where there is no change in direction, the number of shifts is large, then it can be construed that a turning point found after the number of shifts attained this high value is farthest from the center of the optical axis. An optical distortion correction can be achieved based upon determination.

FIGS. 14 to 21 illustrate another embodiment. In this embodiment, a correction such as an optical distortion correction is performed using, as criteria, reference points at multiple locations, the reference points differing depending upon the region of a subject.

Figure 14:
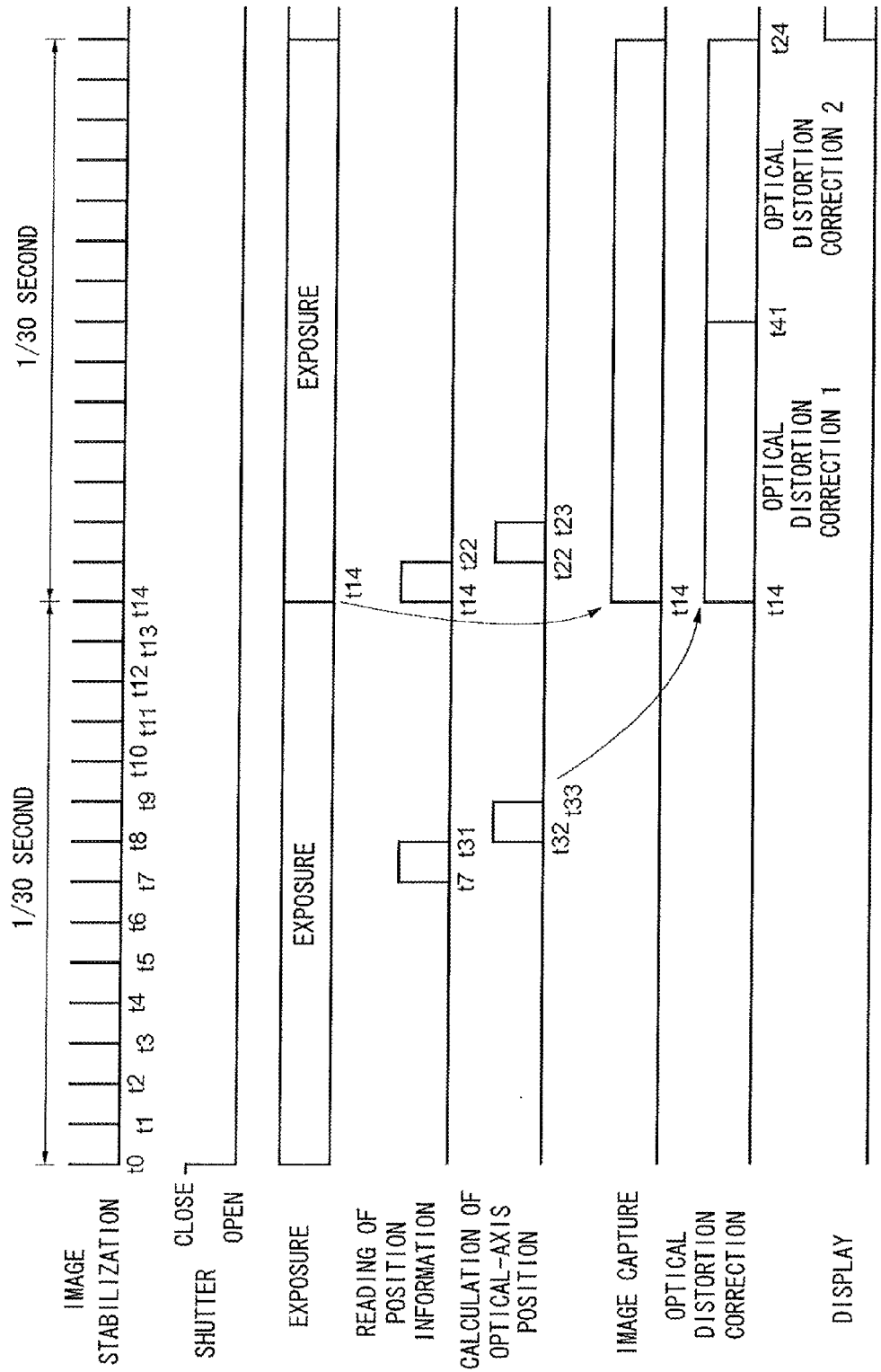
FIG. 14 is a time chart of an image sensing apparatus.
Figure 15:
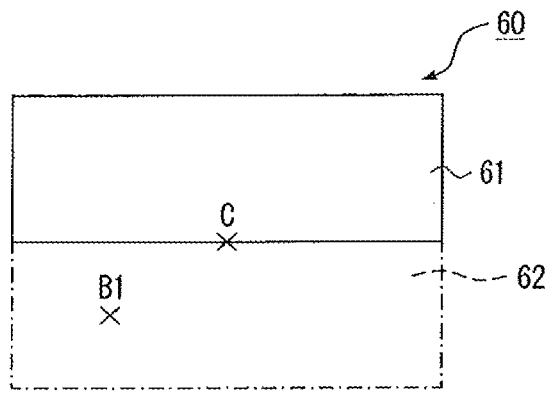
FIGS. 15 and 16 illustrate portions of the image of a subject.
Figure 16:
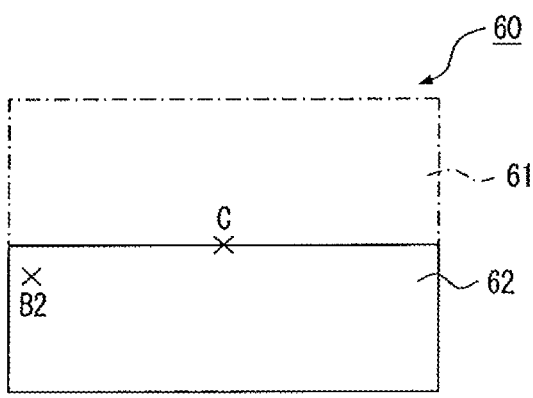

In FIGS. 14 to 16, a correction such as an optical distortion correction is carried out using reference points, which differ between an upper region and a lower region of the image of a subject, as the criteria.

FIG. 14 is a time chart of the image sensing apparatus, FIG. 15 illustrates an upper region 61 of a subject image 60 obtained by imaging, and FIG. 16 illustrates a lower region 62 of the subject image 60.

With reference to FIG. 14, data indicating shift position stored, as described above, at an intermediate time t7 within the period of exposure by performing image stabilization up to time t7 is read from time t7 to time t31. The positional relationship between the upper region 61 of the subject image 60 and optical-axis position utilized in an optical distortion correction is calculated from time t32 to time t33.

With reference to FIG. 15, the center of the subject image 60 is indicated at C. The position of the optical axis calculated, as set forth above, based upon image stabilization performed from time t1 to time t8 is indicated at 81. The upper region 61 of the subject image 60 is subjected to an optical distortion correction (from time t14 to time t41 in FIG. 14) using the optical-axis position, which is indicated at 81, as a reference.

With reference again to FIG. 14, data indicating shift position obtained by executing image stabilization at the timings from time t8 to time t14 is read from time t14 to time t22. The positional relationship between the lower region 62 of the subject image 60 and optical-axis position is calculated from time t22 to time t23.

With reference to FIG. 16, the center of the subject image 60 is indicated at C. The position of the optical axis decided, as set forth above, based upon image stabilization performed from time t8 to time t14 is indicated at 82. The lower region 62 of the subject image 60 is subjected to an optical distortion correction (from time t41 to time t24 in FIG. 14) using the optical-axis position, which is indicated at 82, as a reference.

One frame of the subject image 60 is generated by combining the subject image 60 obtained by applying the optical distortion correction to the upper region 61 using the optical-axis position B1 as the reference and the subject image 60 obtained by applying the optical distortion correction to the lower region 62 using the optical-axis position B2 as the reference.

FIGS. 17 to 20 illustrate execution of a correction such as an optical distortion correction using, as criteria, reference points that differ for an upper region, central region and lower region of the image of a subject.

Figure 17:
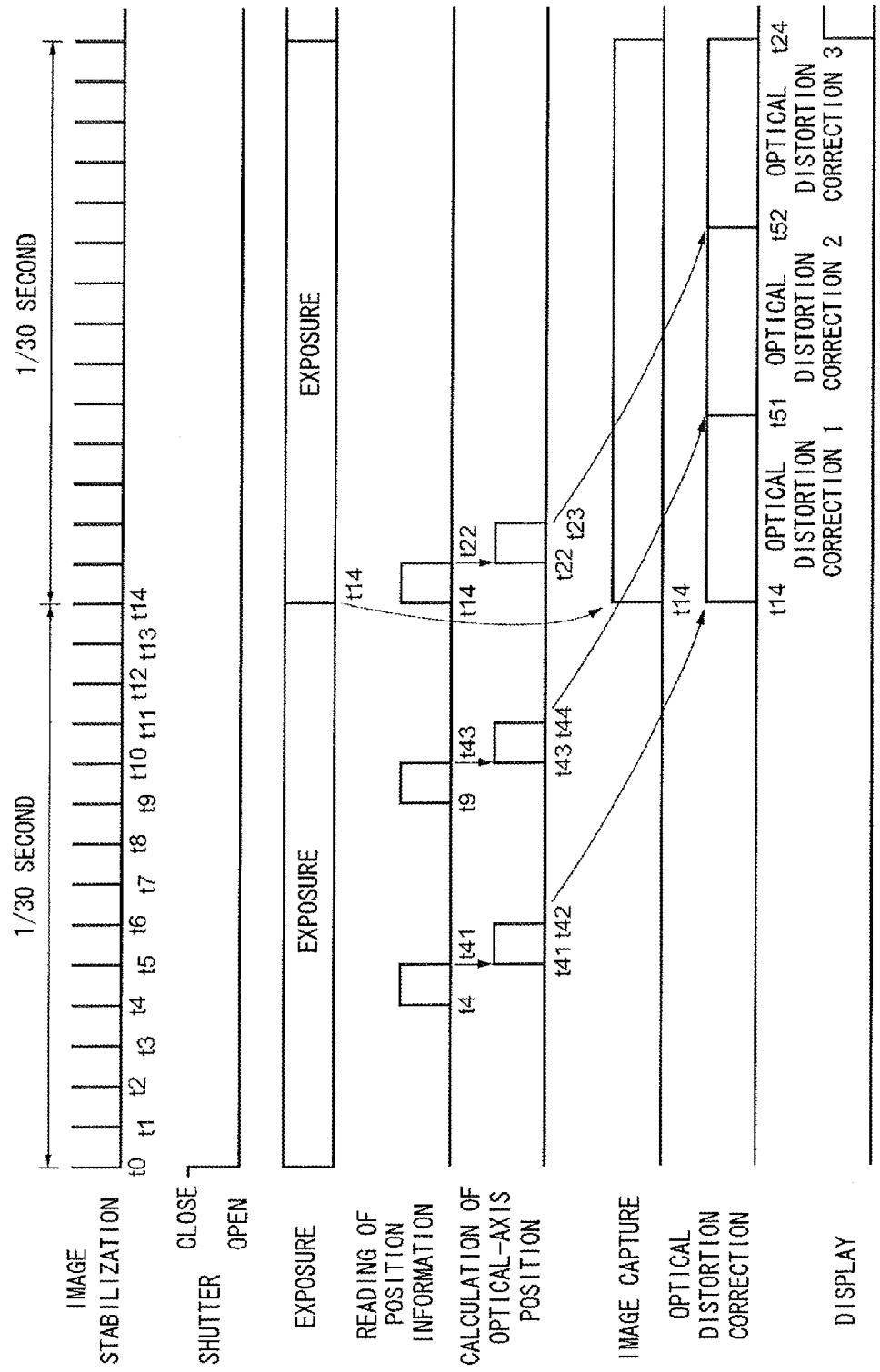
FIG. 17 is a time chart of an image sensing apparatus.
Figure 18:
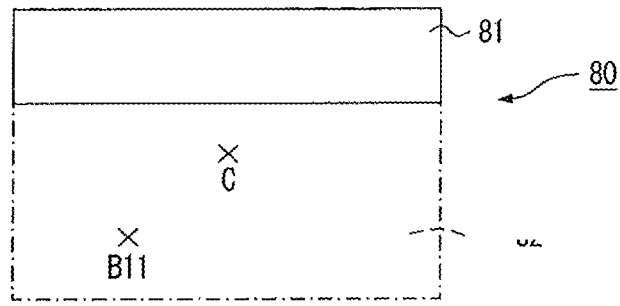
FIGS. 18 to 20 illustrate portions of the image of a subject.
Figure 19:
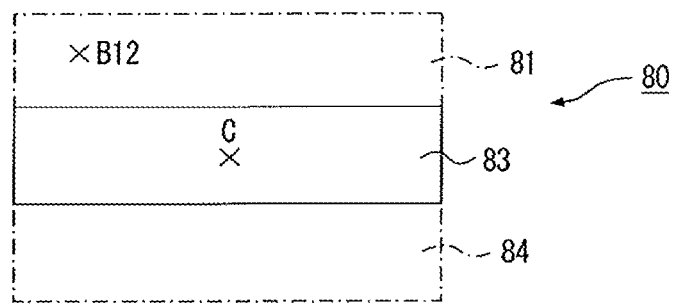
Figure 20:
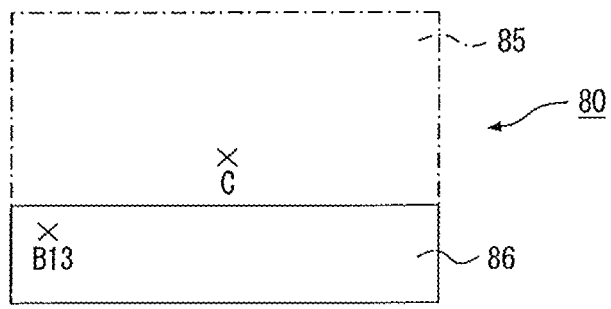

FIG. 17 is a time chart of the image sensing apparatus, FIG. 18 illustrates an upper region 81 of a subject image 80 obtained by imaging, FIG. 19 illustrates a central region 83 of the subject image 90 and FIG. 20 illustrates a lower region 86 of the subject image 80.

With reference to FIG. 17, data indicating shift position obtained at time t4 within the period of exposure by performing image stabilization up to time t4 is read from time t4 to time t41. The positional relationship between the upper region 81 of the subject image 80 and reference utilized in an optical distortion correction is calculated from time t41 to time t42.

With reference to FIG. 18, the center of the subject image 80 is indicated at C. A reference point, which has been decided based upon image stabilization performed from time t1 to time t4, is indicated at B11. The upper region 81 of the subject image 80 is subjected to an optical distortion correction (from time t14 to time t51) using the optical-axis position, which is indicated at B11, as a reference. A region 82, namely a region other than the upper region 81 of the subject image 80, is not subjected to an optical distortion correction using the optical-axis position 811 as the reference.

With reference again to FIG. 17, data indicating shift position obtained at time t9 by image stabilization performed time t5 to time t9 is read from time t9 to time t43. The positional relationship between the central region 83 of the subject image 80 and optical-axis position is calculated from time t43 to time t44.

With reference to FIG. 19, the center of the subject image 80 is indicated at C. The position of the optical axis decided based upon image stabilization performed from time t5 to time t19 is indicated at B12. The central region 83 of the subject image 80 is subjected to an optical distortion correction (from time t51 to time t52 in FIG. 17) using the optical-axis position, which is indicated at B12, as a reference. The upper region 81 and the lower region 84, namely the regions other than the central region 83, are not subjected to an optical distortion correction using the optical-axis position B12 as the reference.

With reference to FIG. 17, data indicating shift position obtained by performing image stabilization from time t10 to time t14 is read from time t14 to time t22. The positional relationship between the lower region 86 of the subject image 80 and reference utilized in an optical distortion correction is calculated from time t22 to time t23.

With reference to FIG. 20, the center of the subject image 80 is indicated at C. A reference point, which has been decided based upon image stabilization performed from time t9 to time t14, is indicated at B13. The lower region 86 of the subject image 80 is subjected to an optical distortion correction (from time t52 to time t24) using the optical-axis position, which is indicated at B13, as a reference. A region 85, namely a region other than the lower region 86 of the subject image 80, is not subjected to an optical distortion correction using the optical-axis position 813 as the reference.

One frame of the subject image 80, which has been corrected for optical distortion, is generated from the upper region 81 shown in FIG. 19, the central region shown in FIG. 19 and the lower region shown in FIG. 20.

Figure 21:
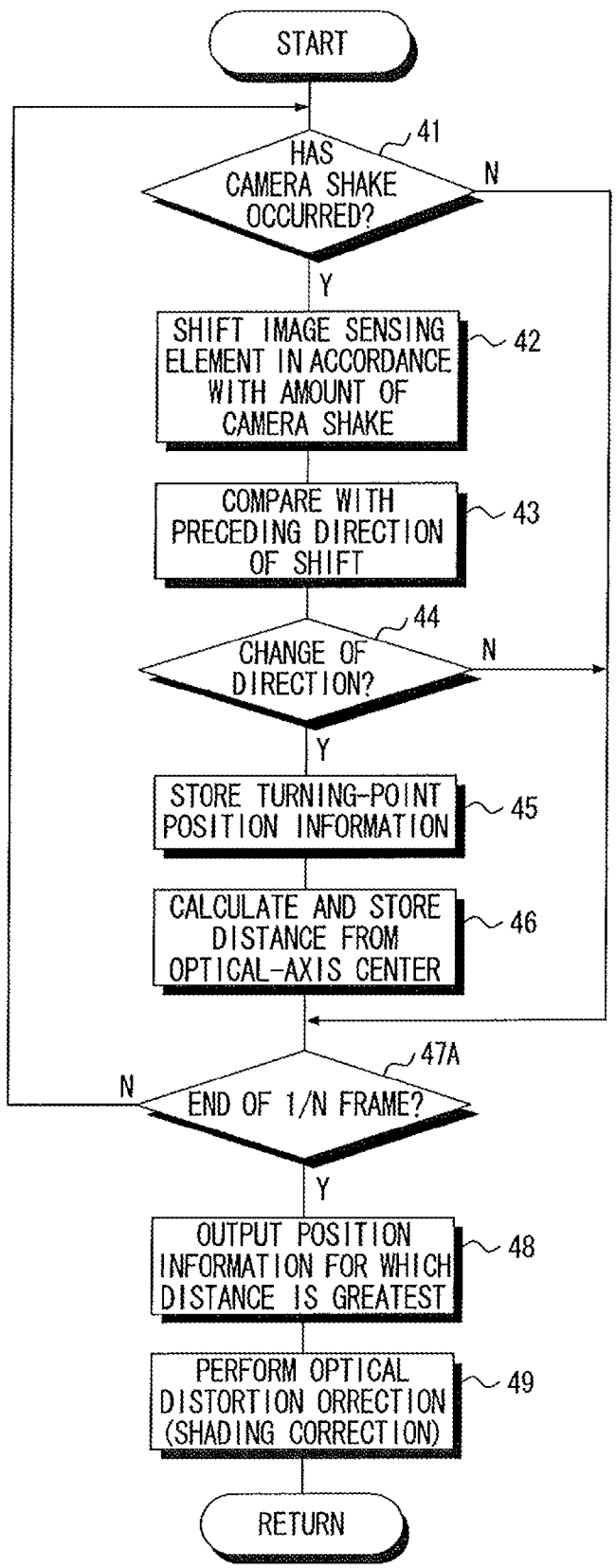
FIG. 21 is a flowchart illustrating optical distortion correction processing.

FIG. 21 is a flowchart illustrating optical distortion correction processing executed by the image sensing apparatus. Processing steps in FIG. 21 identical with those shown in FIG. 10 are designated by like step numbers and need not be described again.

In the processing shown in FIG. 21, a reference point is calculated N times in one frame. When 1/N of the frame ends ("YES" at step 47A), therefore, position information for which the distance from the optical-axis center is greatest is output from among the items of turning-point position information in 1/N frame and an optical distortion correction is performed in the manner described above (steps 48, 49).

Figure 22:
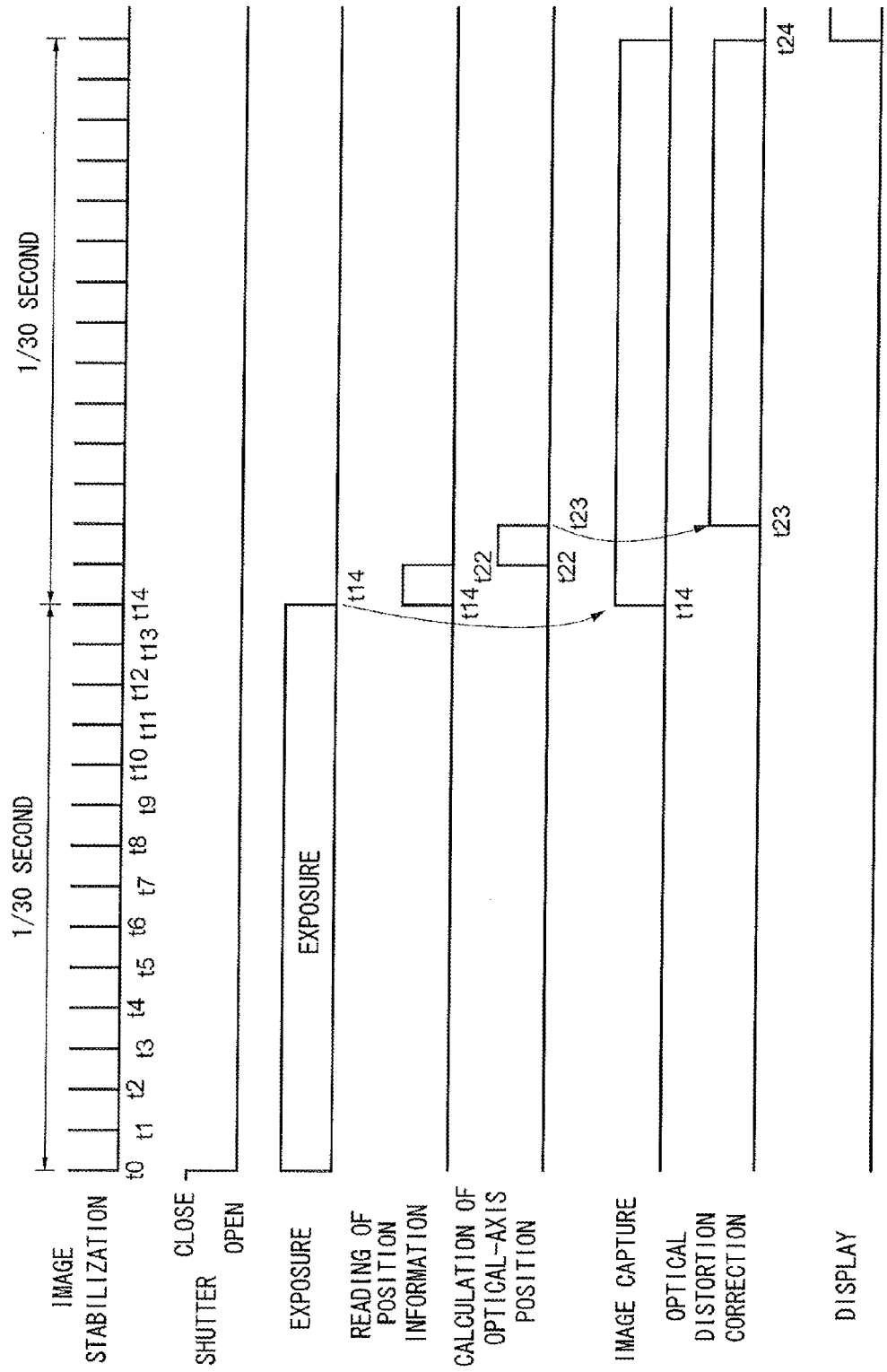
FIG. 22 is a time chart of an image sensing apparatus.

FIG. 22 is a time chart illustrating the processing of the image sensing apparatus.

Whereas the time charts shown in FIG. 5, etc., relate to capture of a moving image, the time chart illustrated in FIG. 22 relates to capture of a still image.

A mechanical shutter is released for 1/30 of a second from time t0 to time t14 and a subject is imaged. It goes without saying that the shutter speed need not be 1/30 of a second. The mechanical shutter is released, image stabilization is performed, as set forth above, during exposure and the still image is subjected to optical distortion correction based upon a calculated reference point. Thus, a correction such as an optical distortion correction according to this embodiment can be applied to a still image as well and is not limited to a moving image.

Figure 23:
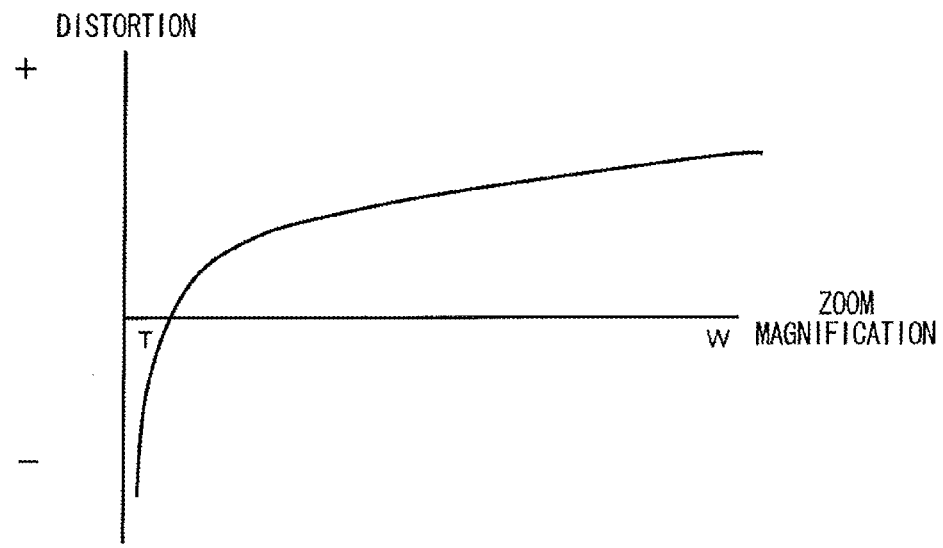
FIGS. 23 and 24 illustrate relationships between distortion and zoom magnification.
Figure 24:
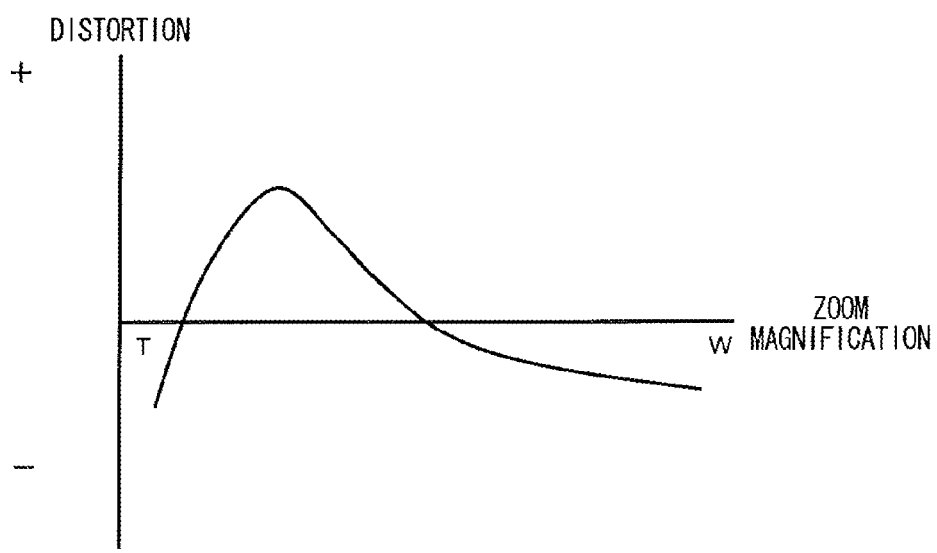
Figure 25:
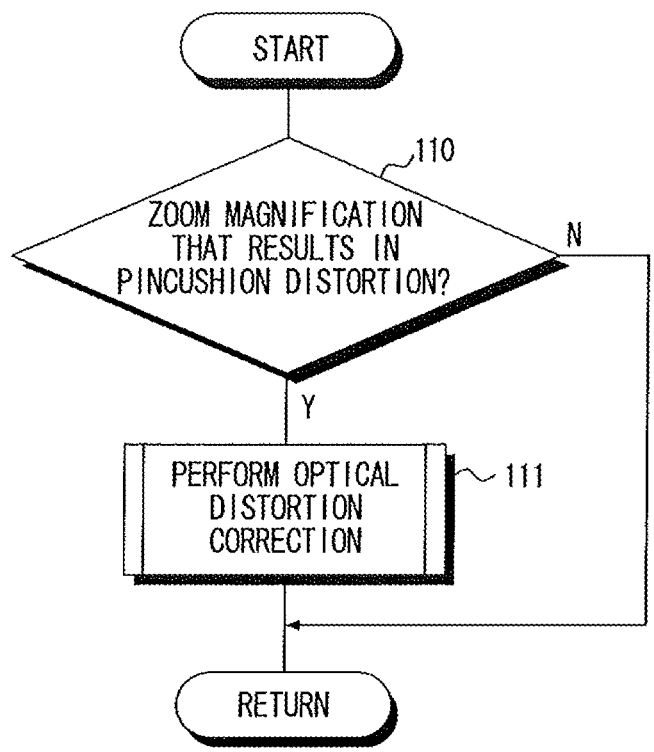
FIG. 25 is a flowchart illustrating optical distortion correction processing.

FIGS. 23 to 25 illustrate yet another embodiment. Here the above-described optical distortion correction is performed in accordance with zoom magnification.

FIGS. 23 and 24 illustrate the relationship between distortion and zoom magnification.

The horizontal axis indicates zoom magnification, which approaches wide angle (W) the farther rightward the value is along the axis and approaches telephoto (T) the farther leftward the value is along the axis. The vertical axis indicates amount of distortion. Here the periphery of the image develops greater distortion on the inner side (so-called "pincushion distortion") the farther upward (+ direction) the point is along the axis and develops greater distortion on the outer side (so-called "barrel distortion") the farther downward (− direction) the point is along the axis.

In FIG. 23, the more zoom magnification moves from telephoto toward wide angle, the more distortion increases along the ± direction. In FIG. 24, distortion increases gradually along the direction in a case where zoom magnification moves from telephoto toward wide angle, but increases gradually along the − direction when a predetermined zoom magnification is attained. The relationship between distortion and zoom magnification varies depending upon the characteristics of the zoom lens such that the relationship between distortion and zoom magnification shown in FIG. 23 differs from the relationship between distortion and zoom magnification shown in FIG. 24.

FIG. 25 is a flowchart illustrating processing executed by the image sensing apparatus.

If the zoom magnification has been set such that the result is pincushion distortion ("YES" at step 110), an optical distortion correction is carried out (step 111) by the method described above. If the zoom magnification has been set such that the result is not pincushion distortion ("NO" at step 110), then an optical distortion correction using the above-described method is not carried out.

According to the processing shown in FIG. 25, an optical distortion correction using the above-described method is carried out in a case where the zoom magnification has been set such that the result is pincushion distortion. However, it may be arranged so that an optical distortion correction using the above-described method is carried out in a case where the zoom magnification has been set such that the result is barrel distortion.

Figure 26:
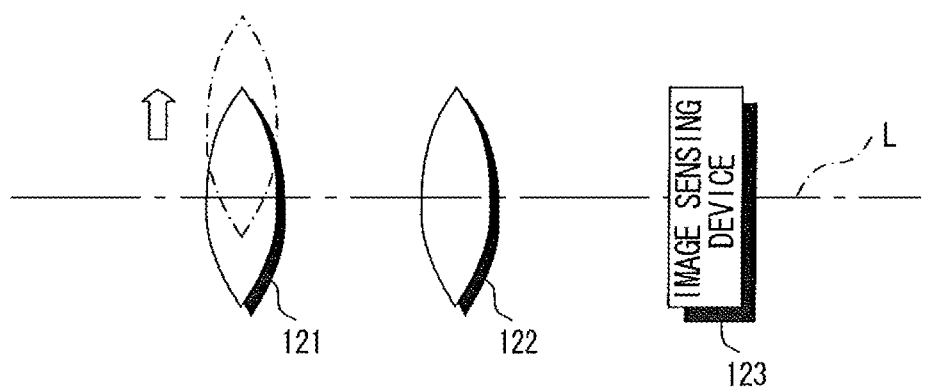
FIG. 26 illustrates the relationship between an imaging lens and an image sensing device.

FIG. 26 is a side view illustrating the manner in which a first imaging lens 121 and a second imaging lens 122 have been placed in front of the photoreceptor surface of an image sensing device 123.

In FIG. 26, an optical distortion correction is performed by shifting the first imaging lens 121 away from the optical axis along the radial direction.

In the foregoing embodiments, an optical distortion correction using the above-described method is carried out by shifting the image sensing device 2 away from the optical axis L of the imaging lens 1 along the radial direction. However, it may be arranged so that an optical distortion correction using the above-described method is carried out by shifting the first imaging lens 121 away from the optical axis 1 in the radial direction rather than by shifting the image sensing device 123.

Even in a case where, instead of the image sensing device 123 being shifted, the first imaging lens 121 is shifted radially away from the optical axis L that passes through the center of the image sensing device 123, the positions to which the central axis of the first imaging lens 121 is shifted are detected by image stabilization as set forth above, and an optical distortion correction can be performed in a manner similar to that described above.

A case where an optical distortion correction according to this embodiment has been applied to an image sensing apparatus is described above. However, the optical distortion correction can also be applied, for example, to a built-in or externally mounted camera for a personal computer, or to a mobile terminal device, such as that described below, having a camera function.

A mobile telephone, a smart phone, a PDA (Personal Digital Assistant) and a mobile game device can be mentioned as examples of a mobile terminal device in this embodiment. The invention will now be described in detail with reference to the drawings taking a smart phone as an example.

Figure 27:
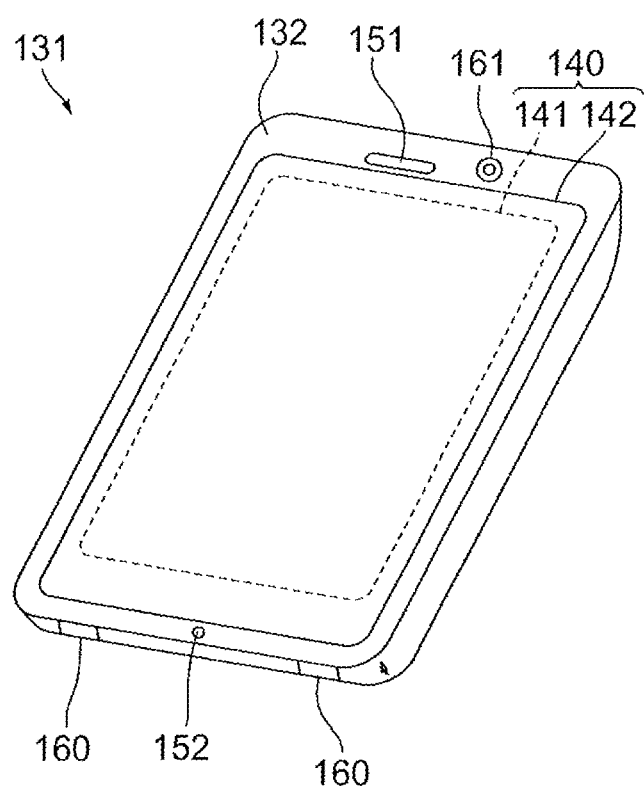
FIG. 27 illustrates the external appearance of a smart phone.

FIG. 27 illustrates the external appearance of a smart phone 131 according to an embodiment of an image sensing in accordance with the present invention.

The smart phone 131 shown in FIG. 27 has a case 132 in the same of a flat plate, and one side face of the case 132 is equipped with a display input unit 140 provided, in the form of a unitary body, with a display panel 141 serving as a display section and with an operating panel 142 serving as an input section. The case 132 is further equipped with a microphone 151, a speaker 152, an operating device 160 and a camera unit 161. The configuration of the case 132 is not limited to that shown here. For example, the case can have a configuration in which a display unit and an input unit are separate from each other, or a configuration having a clam-shell structure or a sliding mechanism.

Figure 28:
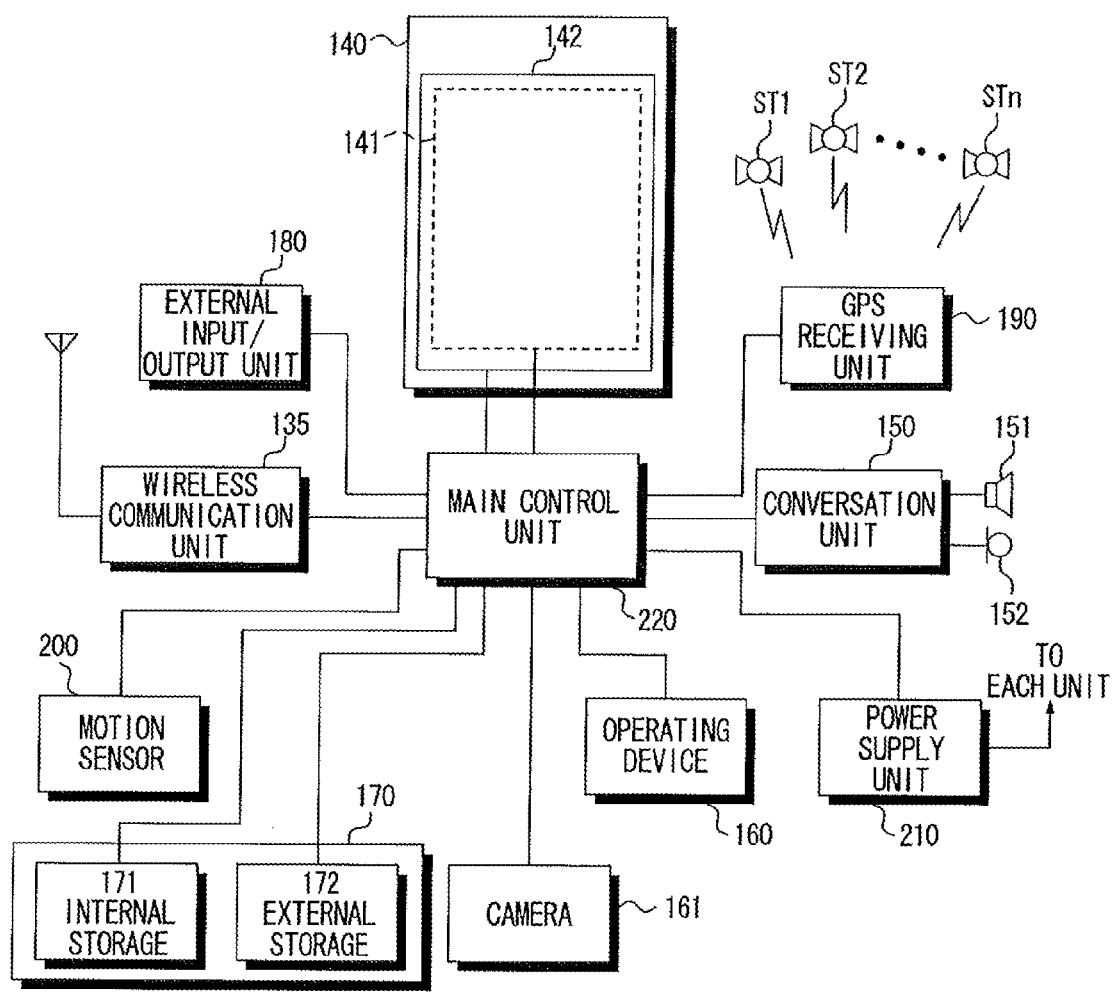
FIG. 28 is a block diagram illustrating the electrical configuration of the smart phone.

FIG. 28 is a block diagram illustrating the configuration of the smart phone 131 shown in FIG. 27.

As shown in FIG. 28, the main components of the smart phone are a wireless communication unit 135, the display input unit. 140, a conversation unit 150, the operating device 160, the camera unit 161, a storage unit 170, an external input/output unit 180 a GPS (Global Positioning System) receiving unit 190, a motion sensor 200, a power supply unit. 210 and a main control unit 220. Further, the smart phone 131 is equipped with a wireless communication function, which is the main function of the smart phone 131, for performing mobile wireless communication via a base station, unit BS and a mobile communication network NW.

In accordance with a command from the main control unit 220, the wireless communication unit 135 performs wireless communication with the base station accommodated in the mobile communication network NW. Using such wireless communication, the wireless communication unit 135 sends and receives various file data such as voice data and image data as well as email data, and receives data such as World-Wide Web data and streaming data.

The display input unit 140 is equipped with the display panel 141 and operating panel 142 in the form of a so-called "touch panel" which, under the control of the main control, unit 220, displays images (still images and moving images) and text information and the like to thereby convey information to the user visually, and detects operations made by the user in response to the information displayed.

The display panel 141 employs a display cell such as an LCD (Liquid Crystal Display) or an OLED (Organic Electro-Luminescence Display) as a display device. The operating panel 142 is a device on which an image, which is displayed on the display screen of the display panel 141, is viewably placed, and detects one or multiple coordinates. It is operated by the user's finger or by a stylus. When this device is touched by the user's finger or by a stylus, the device outputs a detection signal, which is generated due to such operation, to the main control unit 220. Next, based upon the detection signal received, the main control unit 220 detects the position (coordinates) touched on the display panel 141.

As illustrated in FIG. 27, the display panel 141 and operating panel 142 of the smart phone 131 exemplified as an embodiment of an image sensing apparatus are integrated into a whole to thereby construct the display input unit 140. The operating panel 142 is placed so as to completely cover the display panel 141. In a case where such as arrangement is adopted, the operating panel 142 may be equipped with a function for detecting user operation even with regard to an area exterior to the display panel 141. In other words, the operating panel 142 may just as well be equipped with a detection area (referred to as a "display area" below) with regard to the portion that overlaps the display panel 141, and with a detection area (referred to as a "non-display area" below) with regard to the fringe portion that does not overlap the display panel 141.

It should be noted that although the size of the display area and the size of the display panel 141 may coincide perfectly, the two need not necessarily coincide. Further, the operating panel. 142 may be equipped with two sensitive regions, namely one on the fringe portion and one on the portion inwardly thereof. Furthermore, the width of the fringe portion is designed appropriately in accordance with the size of the case 132. In addition, systems such as a matrix switch system, resistive-film system, surface elastic wave system, infrared system, electromagnetic induction system and electrostatic capacitance system can be mentioned as position detection systems employed by the operating panel 142, and any of these systems can be adopted.

The conversation unit 150, which has the speaker 151 and microphone 152, converts the user's voice, which has entered through the microphone 152, to voice data processable by the main control unit 220, decodes voice data, which has been received by the wireless communication unit 135 or external input/output unit 180, and outputs the decoded data from the speaker 151. Further, as shown in FIG. 27, and by way of example, the speaker 151 can be mounted on the same face as the face provided with the display input unit 140, and the microphone 152 can be mounted on the side face of the case 132.

The operating device 160, which is a hardware key using a key switch or the like, accepts commands from the user. For example, as shown in FIG. 27, the operating device 160 is a push-button switch mounted on the side face of the case 132 of smart phone 131. The switch is turned ON by being pressed by a finger or the like and is restored to the OFF state by the restoration force of a spring or the like when the finger is removed.

The storage unit 170 stores the control program and control data of the main control unit 220, applications, software, address data associated with the names and telephone numbers, etc., of communicating parties, email data sent and received, Web data downloaded by Web browsing, and downloaded content, and also stores streaming data temporarily. Further, the storage unit 170 is constituted by an internal storage device 171, which is built in the smart phone, and a removable external storage device 172 having an external memory slot. The internal storage device 171 and external storage device 172 constructing the storage unit 170 are implemented using storage media such as a flash memory, hard disk, a multimedia card micro-type memory or card-type memory [e.g., Micro SD® memory or the like], RAM (Random-Access Memory) and ROM (Read-Only Memory).

The external input/output, unit 180, which functions as the interface with all external devices connected to the smart phone 131, is for connecting directly or indirectly other external devices as by communication [such as Universal Serial Bus (USB) or IEEE 1394] or network [e.g., Internet, wireless LAN (Local-Area Network), Bluetooth®, RFID (Radio-Frequency Identification), Infrared Data Association: IrDA®, UWB (Ultra-Wideband® or Zigbee®].

Examples of devices connected to the smart phone 131 are a wired/wireless headset; wired/wireless external charging device; wired/wireless data port; memory card or SIM (Subscriber Identity Module Card)/UIM (User Identity Module) card connected via a card socket; external audio/video device connected via an audio/video I/O (Input/Output) terminal; wirelessly connected external audio/video device; wired/wireless connected smart phone; wired/wirelessly connected personal computer; wired/wirelessly connected PDA; and earphone. The external input/output section can be adapted so as to transmit data, which has been received from such external devices, to each component within the smart phone 131, and so as to transmit data within the smart phone 131 to the external devices.

In accordance with a command from the main control unit 220, the GPS receiving unit 190 receives GPS signals sent from GPS satellites ST1 to STn, executes positioning processing that is based upon multiple GPS signals received, and detects position comprising the longitude, latitude and elevation of the smart phone 131. When position information is capable of being acquired from the wireless communication unit 135 or external input/output unit 180 (e.g., wireless LAN), the GPS receiving unit 190 can also detect position using this position information.

The motion sensor 200, which has a three-axis acceleration sensor, for example, detects physical motion of the smart phone 131 in accordance with a command from the main control unit 220. The traveling direction and acceleration of the smart phone 131 are detected by detecting the physical motion of the smart phone 131. The result of such detection is output to the main control unit 220.

In accordance with a command from the main control unit 220, the power supply unit 210 supplies each unit of the smart phone 131 with power stored in a battery (not shown).

The main control unit 220, which is equipped with a microprocessor, operates in accordance with a control program and control data stored by the storage unit 170 and controls overall operation of each unit of the smart phone 131. Further, the main control unit 220 has a mobile communication control function, which controls each unit of the communication system, and an application processing function, in order to perform voice communication and data communication through the wireless communication unit 135.

The application processing function is implemented by operation of the main control unit 220 in accordance with application software stored by the storage unit 170. Examples of the application processing function are an infrared communication function for communicating data with an opposing device by controlling the external input/output unit 180, an email function for sending and receiving email, and a Web browsing function for viewing Web pages.

The main control unit 220 has an image processing function for displaying video on the display input unit 140 based upon received data and image data (still-image data and moving-image data) such as downloaded streaming data. The image processing function refers to a function whereby the main control unit 220 decodes the above-mentioned image data, applies image processing to the decoded result and displays the resultant image on the display input unit 140.

The main control unit 220 further executes display control of the display panel 141 and operation detection control for detecting user operation through the operating device 160 and operating panel 142.

By executing display control, the main control unit 220 displays icons for launching application software, software keys such as a scroll bar, or displays a window for creating email. It should be noted that the scroll bar refers to a software key for accepting a command, which moves a displayed portion of an image, with regard to an image too large to fit in the display area of the display panel 141.

Further, by executing operation detection control, the main control unit 220 detects user operation performed via the operating device 160, accepts tapping of the icons and character-string inputs to an input section of the above-mentioned window, or accepts a displayed-image scroll request issued through the scroll bar.

Furthermore, the main control unit 220 has a touch-panel control function which, through execution of the operation detection function, determines whether a position touched on the operating panel 142 is a portion (the display area) that overlaps the display panel 141 or a fringe portion (the non-display area) that does not overlap the display panel 141, and controls the sensitive region of the operating panel 142 and the display positions of software keys.

Further, the main control unit 220 detects gestures applied to the operating panel 142 and is capable of executing preset functions in accordance with a detected gesture. Here a gesture refers not to a simple, conventional touching operation but to the tracing of a path by a finger or the like, the designation of multiple positions simultaneously, or an operation which, by combining these, traces a path with regard to at least one of multiple positions.

The camera unit 161 is a digital camera for performing electronic shooting using a CMOS (Complementary Metal-Oxide Semiconductor) or CCD (Charge-Coupled Device) or the like. Further, under control exercised by the main control unit 220, the camera unit 161 converts image data obtained by imaging to compressed image data such as JPEG (Joint Photographic coding Experts Group) data and is capable of storing the compressed image data in the storage unit 170 or of outputting the data through the external input/output unit 180 or wireless communication unit 135. In the smart phone 131 shown in FIG. 27, the camera unit 161 has been mounted on the same side as that having the display input unit 140. However, the mounting position of the camera unit 161 is not limited to that shown. The camera unit 161 may be mounted on the back side of the display input unit 140, and it is permissible to mount a plurality of camera units 161. It should be noted that in a case where a plurality of the camera units 161 have been mounted, the camera units 161 used in shooting may be switched among and used singly, or shooting may be performed by using the plurality of camera units 161 simultaneously.

Further, the camera unit 161 can be utilized for various functions possessed by the smart phone 131. For example, an image acquired by the camera unit 161 can be displayed on the display panel 141, and the image from the camera unit 161 can be utilized as one operational input on the operating panel 142. Further, when the GPS receiving unit 190 detects position, position can also be detected by referring to the image from the camera unit 161. Furthermore, by referring to the image from the internal storage device 171, the optical-axis direction of the camera unit 161 of smart phone 131 can be determined without using a three-axis acceleration sensor or in conjunction with a three-axis acceleration sensor, and the present environment of use can be determined. Naturally, the image from the camera unit 161 can be utilized within the application software as well.

In addition, such information as position information acquired by the GPS receiving unit 190, voice information acquired by the microphone 152 (which may be text information obtained by a voice-to-text conversion performed by the main control unit or the like), and attitude information acquired by the motion sensor 200 can be appended to still-image or moving-image data and the result can be stored in the storage unit 170 or can be output through the external input/output unit 180 or wireless communication unit 135.

In a case where an optical distortion correction (shading correction) according to this embodiment is applied to the smart phone 131, such units as the image-stabilization driving unit 21, sensor position detection unit 15 and optical distortion/shading correction unit 27 would be accommodated within the camera unit 161.

In the foregoing embodiments, the initial positions adjusted at the time of manufacture of the image sensing apparatus are the center of the image sensing device and the optical-axis center of the imaging lens (imaging optical system); they are not limited to true center. Further, the four corners of the imaging lens 1 rather than the center of the imaging lens 1 may be adopted as the reference.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus having an image sensing device for imaging a subject and outputting image data representing the image of the subject, an imaging optical system, which is provided in front of a photoreceptor surface of the image sensing device, for forming the image of the subject on the photoreceptor surface of the image sensing device, and an image stabilization mechanism for correcting relative positions of center of the image sensing device and optical-axis center of the imaging optical system in accordance with camera shake, said image sensing apparatus comprising:

a position detector that detects, multiple times during period of exposure of the image sensing device, positions to which the center of the image sensing device and the optical-axis center of the imaging optical system have been moved relative to each other by said image stabilization mechanism;

an optical-axis calculator that calculates, as position of the optical axis, from the positions detected by said position detector, the position of the optical-axis center of the imaging optical system in the image of the subject imaged by the image sensing device;

a corrector that performs at least one correction of an optical distortion correction or shading correction of the image of the subject imaged by the image sensing device, by using the position of the optical-axis center calculated by said optical-axis position calculator; and a path generator that generates a path of the positions detected multiple times by said position detector to represent spatial positions of the center of the image sensing device and the optical-axis center of the imaging optical system that have been moved relative to each other by said image stabilization mechanism;

wherein said optical-axis position calculator calculates the position of the optical axis of the imaging optical system in the image of the subject imaged by the image sensing device, this being calculated from a position at which there has been a change in direction in the vertical direction or in the horizontal direction, this position being among positions to which the image sensing device and the imaging optical system have been moved relative to each other, these positions being indicated by the path generated by said path generator.

2. The apparatus according to claim 1, wherein said optical-axis position calculator calculates the position of the optical axis from a position of maximum offset between the image sensing device and imaging optical system, the position of maximum offset being among the positions detected multiple times by said position detector.

3. The apparatus according to claim 1, wherein said optical-axis position calculator calculates the position of the optical axis of the imaging optical system in the image of the subject imaged by the image sensing device, this being calculated from a position at which there has been a change in direction in the vertical direction or in the horizontal direction in a case where amount of movement is equal to or greater than a threshold value, this position being among positions to which the image sensing device and imaging optical system have been moved relative to each other, these positions being indicated by the path generated by said path generator.

4. The apparatus according to claim 1, wherein the image sensing device outputs partial image data, which represents a portion of the image of the subject, multiple times during the period of exposure;

wherein said corrector performs an optical distortion correction or a shading correction of a partial image, which is represented by current partial image data, using positions detected by said position detector from output of preceding partial image data until output of the current partial image data from the image sensing device.

5. The apparatus according to claim 1, wherein the image sensing device images a subject at a fixed period and outputs image data representing the image of a subject of a moving image, or outputs image data representing the image of a subject of a still image by performing exposure over a given shutter time.

6. The apparatus according to claim 1, further comprising a zoom lens for changing the size of the image of the subject, which is formed on the photoreceptor surface of the image sensing device, without changing focal length of the imaging optical system;

wherein said corrector performs an optical distortion correction of the image of the subject imaged by the image sensing device, using a position detected by said position detector, when the position of the zoom lens is such that amount of optical distortion is equal to or greater than a first threshold value or less than a second threshold value.

7. The apparatus according to claim 1, wherein said optical-axis position detector detects, as the position of the optical axis, an average position of the positions detected multiple times by said position detector.

8. A method of controlling operation of an image sensing apparatus having an image sensing device for imaging a subject and outputting image data representing the image of the subject, an imaging optical system, which is provided in front of a photoreceptor surface of the image sensing device, for forming the image of the subject on the photoreceptor surface of the image sensing device, and an image stabilization mechanism for correcting relative positions of center of the image sensing device and optical-axis center of the imaging optical system in accordance with camera shake, the method comprising steps of:

detecting, by utilizing a position detector, multiple times during period of exposure of the image sensing device, positions to which the center of the image sensing device and the optical-axis center of the imaging optical system have been moved relative to each other by the image stabilization mechanism;

calculating, by utilizing an optical-axis position calculator, as position of the optical axis, from the positions detected by the position detector, the position of the optical-axis center of the imaging optical system in the image of the subject imaged by the image sensing device;

performing at least one correction of an optical distortion correction or shading correction of the image of the subject imaged by the image sensing device, by using the position of the optical-axis center calculated by the optical-axis position calculator; and generating a path of the positions detected multiple times by said position detector to represent spatial positions of the center of the image sensing device and the optical-axis center of the imaging optical system that have been moved relative to each other by said image stabilization mechanism;

wherein said optical-axis position calculator calculates the position of the optical axis of the imaging optical system in the image of the subject imaged by the image sensing device, this being calculated from a position at which there has been a change in direction in the vertical direction or in the horizontal direction, this position being among positions to which the image sensing device and the imaging optical system have been moved relative to each other, these positions being indicated by the path.

* * * * *